(12) United States Patent
Park et al.

(10) Patent No.: US 12,162,743 B2
(45) Date of Patent: Dec. 10, 2024

(54) LIQUID DISPENSER

(71) Applicant: LG ELECTRONICS INC., Seoul (KR)

(72) Inventors: Jongwoo Park, Seoul (KR); Sangki Woo, Seoul (KR); Ji Sun Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 407 days.

(21) Appl. No.: 17/551,832

(22) Filed: Dec. 15, 2021

(65) Prior Publication Data

US 2022/0185652 A1 Jun. 16, 2022

(30) Foreign Application Priority Data

Dec. 15, 2020 (KR) .................. 10-2020-0175282

(51) Int. Cl.
*B67D 1/12* (2006.01)
*B67D 1/00* (2006.01)

(52) U.S. Cl.
CPC ......... *B67D 1/1277* (2013.01); *B67D 1/0014* (2013.01); *B67D 2001/0094* (2013.01); *B67D 2001/0095* (2013.01)

(58) Field of Classification Search
CPC ............................. B67D 1/1277; B67D 1/0014
See application file for complete search history.

(56) References Cited

U.S. PATENT DOCUMENTS

| 9,468,872 B2 * | 10/2016 | Laverdiere | ............. B01D 29/52 |
| 2014/0086565 A1 * | 3/2014 | Lilley | ...................... B67D 1/07 |
| | | | 134/169 R |
| 2014/0091027 A1 * | 4/2014 | Laverdiere | .......... F16L 19/0225 |
| | | | 29/428 |

FOREIGN PATENT DOCUMENTS

| CN | 201317693 Y | 9/2009 | | |
| CN | 203577432 U | 5/2014 | | |
| CN | 104944607 A | 9/2015 | | |
| KR | 10-0785513 | 12/2007 | | |
| KR | 10-0804302 | 2/2008 | | |
| KR | 10-2017-0093181 | 8/2017 | | |
| KR | 20170093181 A * | 8/2017 | ............... C02F 9/00 |
| KR | 10-2017-0133723 | 12/2017 | | |
| KR | 10-2018-0110809 | 10/2018 | | |
| KR | 20180110809 A * | 10/2018 | ......... B01D 35/1573 |
| KR | 10-2018-0135265 | 12/2018 | | |
| KR | 10-2154183 | 9/2020 | | |

OTHER PUBLICATIONS

Machine Translation of KR-20170093181-A.*
Machine translation of KR-20180110809-A.*

* cited by examiner

*Primary Examiner* — Jeremy Carroll
(74) *Attorney, Agent, or Firm* — KED & ASSOCIATES, LLP

(57) ABSTRACT

A water purifier includes a valve comprising a plurality of valves configured to control a direction of water flow; an integrated water way part in which the valve is inserted along one predetermined direction and a plurality of water ways connected with the valves are provided; and a case covering the valve and the integrated water way part, in a state where the valve and the integrated water way are coupled to each other, the case having one side that is open and closed to expose the integrated water way outside.

20 Claims, 28 Drawing Sheets

LIQUID DISPENSER

CROSS-REFERENCE TO RELATED APPLICATION

This application claims priority to and the benefit of Korean Patent Application No. 10-2020-0175282, filed in Korea on Dec. 15, 2020, the disclosure of which is incorporated herein by reference in its entirety.

BACKGROUND

1. Field

Disclosed herein is a liquid dispenser, more particularly, a water purifier that may facilitate coupling between a valve and an integrated water way part smoothly.

2. Background

In general, a water purifier is a device for eliminating the impurities contained in water by filtering and such water purifiers are widely used in homes and businesses.

A water purifier used in a home is connected to a water supply source and configured to remove floating matters or harmful substances that are contained in tap water by means of a filter. A user may purify and extract water as much as he or she wants based on the user's manipulation.

The user may get cold water and hot water from the water purifier. To extract the cold and hot water, control valves for hot water and cold water, respectively, may be installed in the water purifier.

Cited document 1 (China Patent Publication No. 104944607 published on Sep. 30, 2015 and the title of the invention: Water purifying equipment and Integrated waterway module thereof) discloses a waterway module that is directly installed in a water purifier. A plurality of passages may be provided in the direct waterway module and a plurality of connection ports may be provided in an outer portion of the direct waterway module.

A control valve may be connected to the connection port and the control valve may be directly secured to the waterway module by a securing member (e.g., a bolt).

However, according to Cited document 1, the water purifier has to be disassembled when trying to replace the direct waterway module. After the direct waterway module and the control valve are disassembled together, a bolt for securing the control valve may be unbolted to disassemble the control valve from the direct waterway module again. Accordingly, there may be a problem in that the time and cost required for replacement and maintenance work of the direct waterway module increase.

In addition, Cited document 1 may not disclose an auxiliary handle structure for allow a user to disassemble only the waterway module installed in the water purifier, which may also cause the problem in that the time and cost required for replacement and maintenance work of the direct waterway module increase.

Cited document 2 (China Patent Registration No. 201317693 Y registered on Sep. 30, 2009 and Title of the Invention: Integrated waterway-type reverse osmosis membrane water purifier without waste waterway-type) discloses a water purifier including a case, a plurality of waterways integrally formed with the case, wherein a filter is fitted to the case. In addition, a pipe joint connected to a control valve may be secured to an outer surface of the case. Accordingly, the water flow through the filter and the control valve may be facilitated by the waterway provided in the case such that the wiring work may become simple.

However, according to Cited document 2, the filter may be simply fitted to the case forming the integrated waterway. Accordingly, there may be a problem in that the filter might be separated from the case by the water pressure or a problem of water leak.

In addition, according to Cited document 2, the water purifier has to be disassembled when trying to replace the case having the integrated waterway. After the case connected with the filter and the control valve is disassembled from the water purifier, the filter and the control valve have to be disassembled from the case again. Accordingly, there may be a problem in that the time and cost required for replacement and maintenance work of the case having the integrated waterway increase.

In addition, Cited document 2 may not disclose an auxiliary handle structure for allow a user to disassemble only the waterway module installed in the water purifier, which may also cause the problem in that the time and cost required for replacement and maintenance work of the direct waterway module increase.

Cited document 3 (China Patent Registration No 203577432 U, registered on May 7, 2014 and Title of the invention: Water purifier integrated module) discloses that a channel is integrally formed in a base of a water purifier and that a water purifier filter is connected to one side of the base. Accordingly, the connecting work of the waterway connected with the filter may be simple.

However, according to Cited document 3, the water purifier filter is simply fitted to the base having the integrated channel. There might be a problem in that the water purifier filter is separated from the base or water leaks between the filter and the base.

In addition, according to Cited document 3, the water purifier has to be totally disassembled when trying to replace the case to which the water purifier filter is connected. After the case together with the filter is disassembled from the water purifier, the water purifier filter has to be disassembled from the base again. Accordingly, there may be a problem in that the time and cost required for replacement and maintenance work of the case having the integrated channel increase.

In addition, Cited document 3 may not disclose an auxiliary handle structure for allow a user to disassemble only the base integrated with the channel, which may also cause the problem in that the time and cost required for replacement and maintenance work of the base integrally formed with the channel increase.

BRIEF DESCRIPTION OF THE DRAWINGS

Embodiments will be described in detail with reference to the following drawings in which like reference numerals refer to like elements, and wherein.

DETAILED DESCRIPTION

Figure 1:
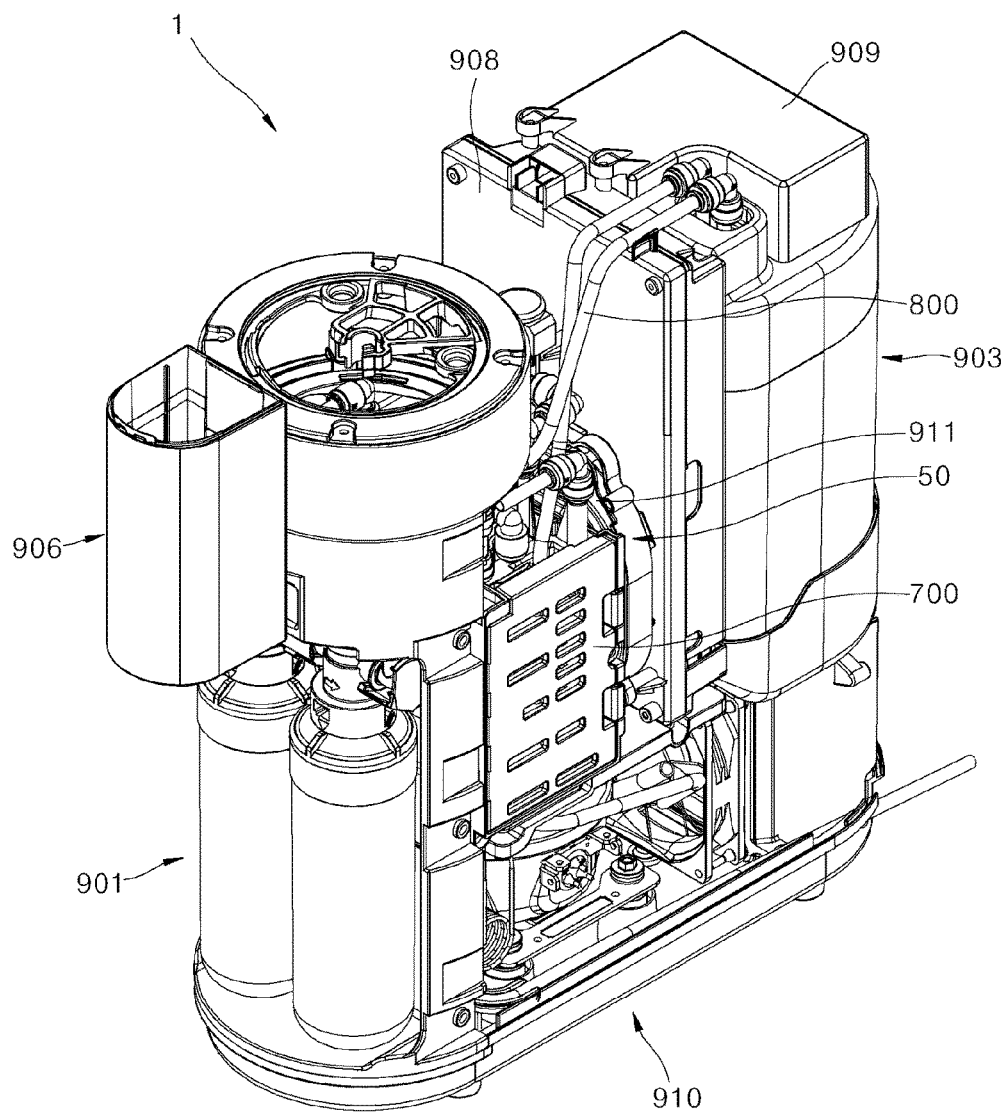
FIG. 1 is a perspective diagram illustrating a water purifier according one embodiment of the present disclosure.

The above-described aspects, features and advantages are specifically described hereunder with reference to the accompanying drawings such that one having ordinary skill in the art to which the present disclosure pertains can easily implement the technical spirit of the disclosure. In the disclosure, detailed descriptions of known technologies in relation to the disclosure are omitted if they are deemed to make the gist of the disclosure unnecessarily vague. Below, preferred embodiments according to the disclosure are specifically described with reference to the accompanying drawings. In the drawings, identical reference numerals can denote identical or similar components.

The terms "first", "second" and the like are used herein only to distinguish one component from another component. Thus, the components should not be limited by the terms. Certainly, a first component can be a second component unless stated to the contrary.

Hereinafter, expressions of 'a component is provided or disposed in an upper or lower portion' may mean that the component is provided or disposed in contact with an upper surface or a lower surface, and also it may mean that other elements are provided between the components and on the component or beneath the component.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Throughout the disclosure, the terms "A and/or B" as used herein can denote A, B or A and B, and the terms "C to D" can denote C or greater and D or less, unless stated to the contrary.

[Overall Structure of a Water Purifier]

Figure 2:
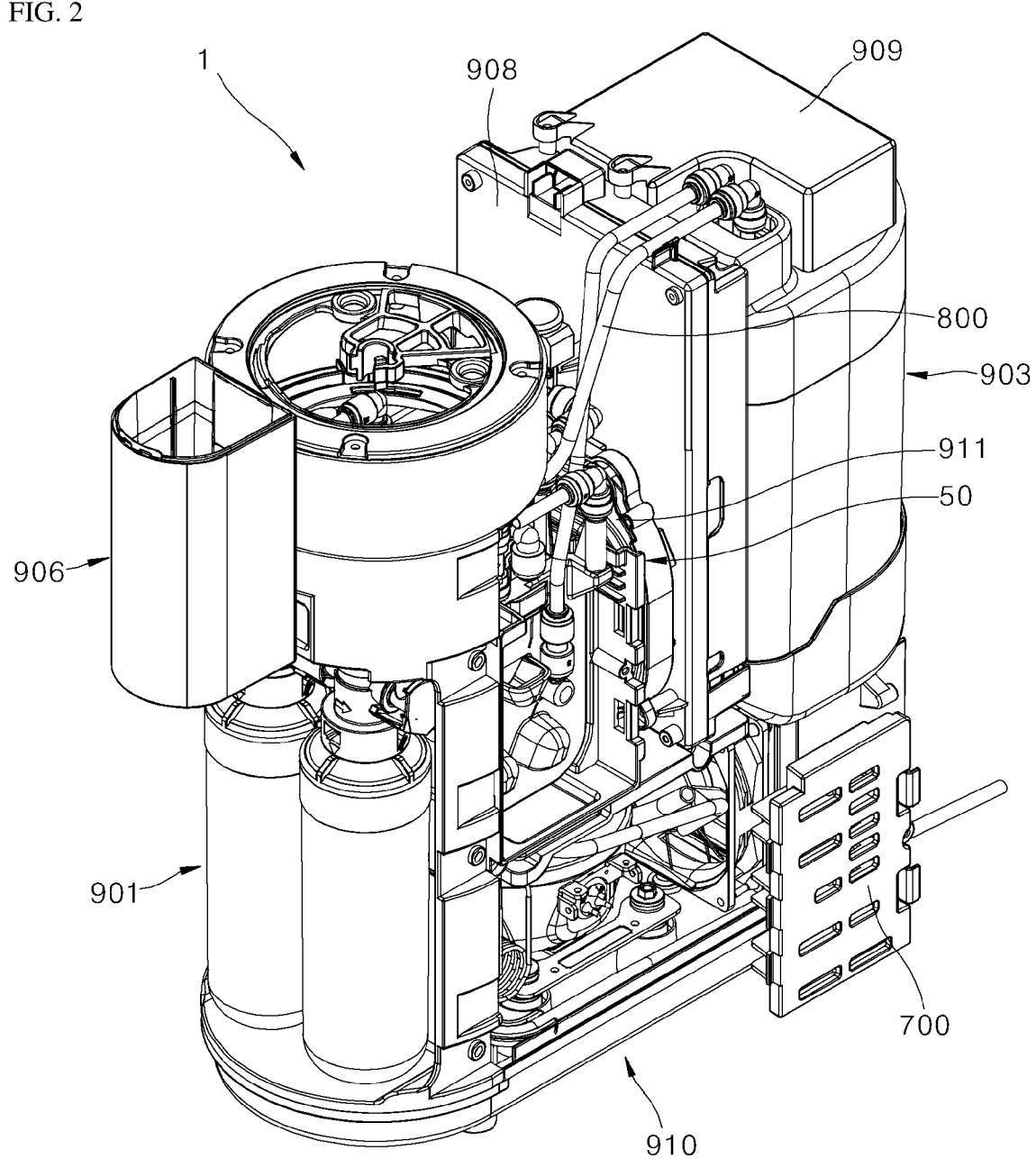
FIG. 2 is a perspective diagram illustrating a state where a door is disassembled from a water purifier according to one embodiment.
Figure 3:
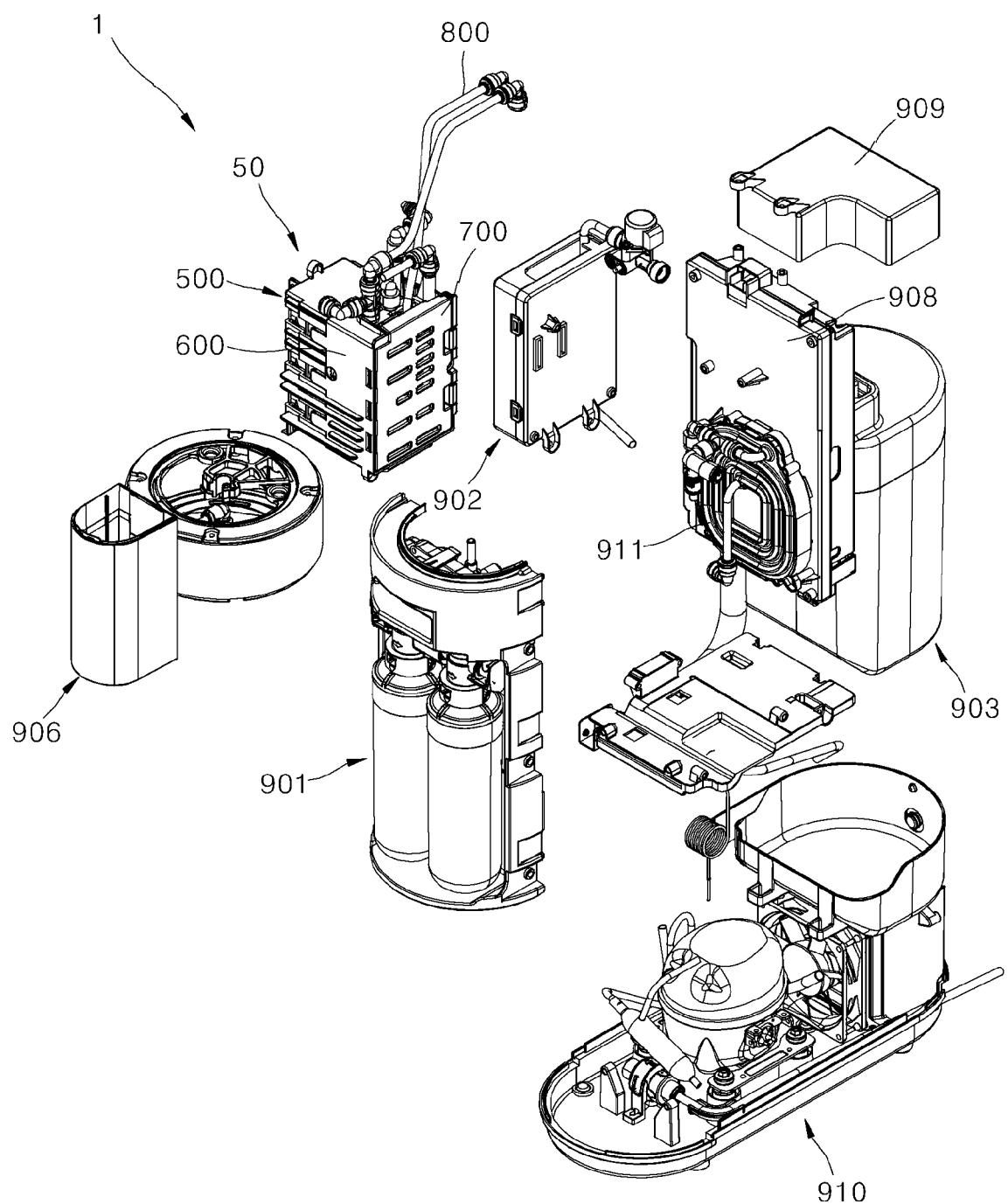
FIG. 3 is an exploded perspective diagram of a water purifier according to one embodiment.
Figure 28:
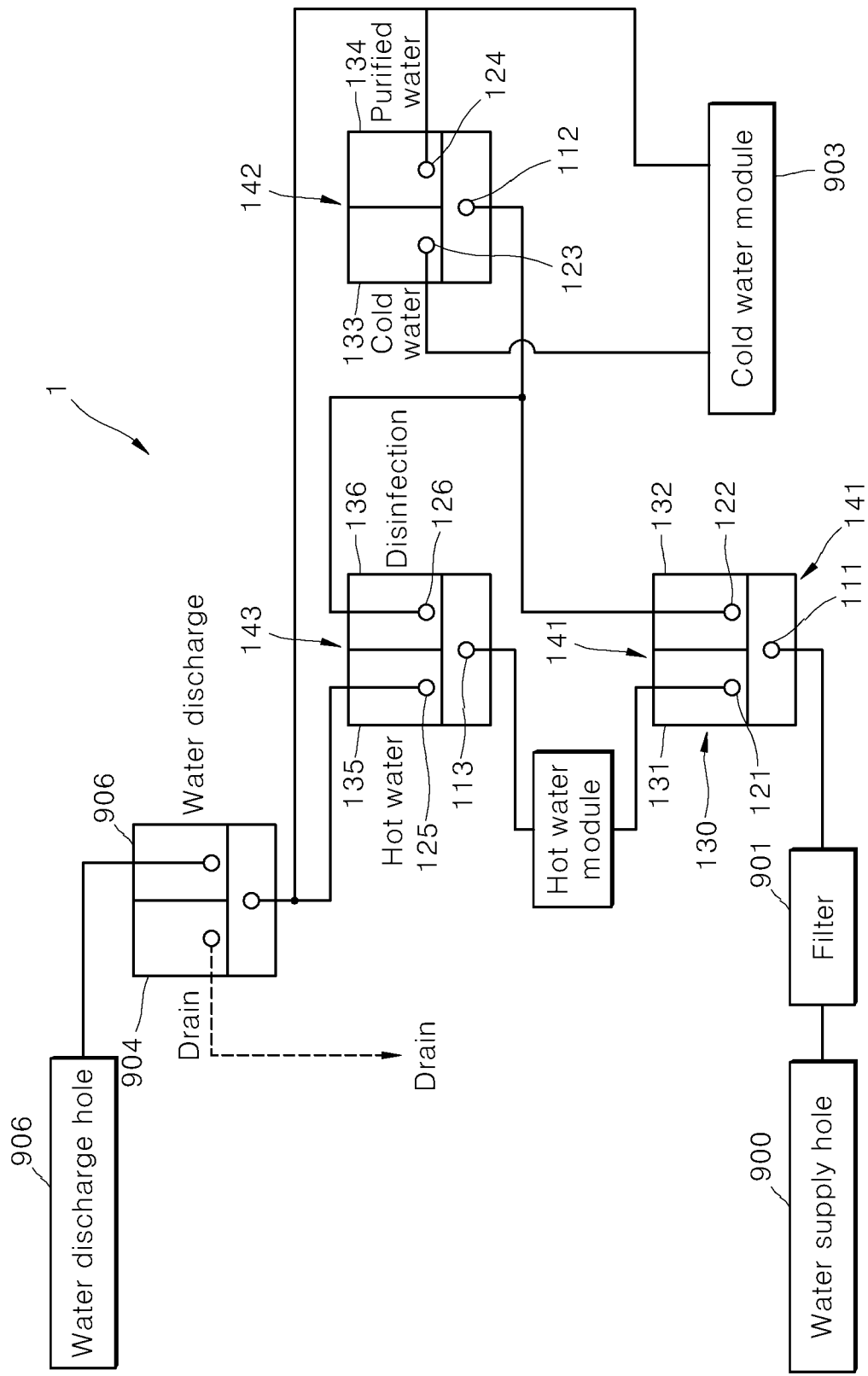
FIG. 28 is a block diagram illustrating key parts of a water purifier according to one embodiment.

FIG. 1 is a perspective diagram illustrating a water purifier (or liquid dispenser) 1 according one embodiment of the present disclosure. FIG. 2 is a perspective diagram illustrating a state where a door 700 is disassembled from a water purifier 1 according to one embodiment. FIG. 3 is an exploded perspective diagram of a water purifier 1 according to one embodiment. FIG. 28 is a block diagram illustrating key parts of a water purifier 1 according to one embodiment.

As shown in FIGS. 1, 2 3 and 28, the water purifier 1 according to one embodiment of the present disclosure may facilitate withdrawal and replacement work of an integrated waterway part (or liquid way assembly) 200 by means of case 500 having one side that is open or closed. The integrated waterway part 200 may be exposed outside by the opening and closing of one side provided in the case 500 that faces the integrated waterway part 200. Accordingly, the integrated waterway part 200 may be smoothly withdrawn and replaced without disassembling the water purifier 1 completely.

In addition, a waterway of the water purifier 1 may be integrally formed as one body so as to simplify the waterway for water flow and facilitate the assembling and replacement of the waterway. The integrated waterway part 200 having the integrally formed water way may be moved linearly and coupled to a valve (or valve assembly) 100. As the waterway part 200 is used, material cost reduction, increased productivity, simplification of complex internal structure and saving of the time and money required by assembling and replacement may be achieved, compared with the prior art.

A plurality of holes may be provided in one surface of the integrated waterway part 200 facing the valve 100 to couple the waterway to the valve 100. A handle may be provided in the other surface of the integrated waterway part 200 to facilitate the coupling and decoupling of the integrated waterway part 200.

The water purifier 1 according to one embodiment of the present disclosure may include at least one of a valve 100, an integrated waterway part 200, a case 500, a filter 901, a water supply hole 900, a hot water module 902, a cold water module 903, a drain valve 904, a water outlet valve 905, a water discharge portion 120, a hot water tank 907, a first controller 908, a second controller 909 or a base assembly 910.

The case 500, the valve 100 and the integrated waterway part 200 may be integrally formed as one module. The valve 100 and the integrated waterway part 200 may be connected to the inside of the case 500. The module configured of the case 500, the valve 100 and the integrated waterway part 200 may be a direct water pipe module 50. The direct water pipe module 50 may be assembled in unit modules. As needed, replacement and maintenance work may be performed in unit modules.

The filter 901 for filtering water and the cold water module 903 for chilling the purified water may be disposed in an upper area of the base assembly 910. The direct water pipe module 50 for controlling water flow may be disposed between the filter 901 and the cold water module 903.

The hot water module 902 for heating water and the hot water tank 907 for collecting the heated water may be installed near the direct water pipe module 50. In addition, the first controller 908 and the second controller 909 may be installed in the upper area of the base assembly 910 to control the operation of the water purifier 1.

The water outlet hole 906 may be provided over the filter 901 and configured to discharge cold water, purified water and hot water. Although an outer case is not shown in the water purifier 1 of FIG. 1, the configuration of the outer case is well-known in the art to which the present disclosure pertains and detailed description thereof is omitted.

Directions may be defined as follows. With respect to the integrated waterway part 210, a direction in which the valve 100 is positioned may be a rear direction and a direction in which the door 700 is positioned may be a front direction. Also, a direction in which a case cover 650 is positioned may be an upper direction and a direction in which a case base 660 is positioned may be a lower direction. A longitudinal direction L may be a front-back direction and a width direction W may be a left-right direction that is perpendicular to the longitudinal direction L.

[Direct Water Pipe Module]

Figure 4:
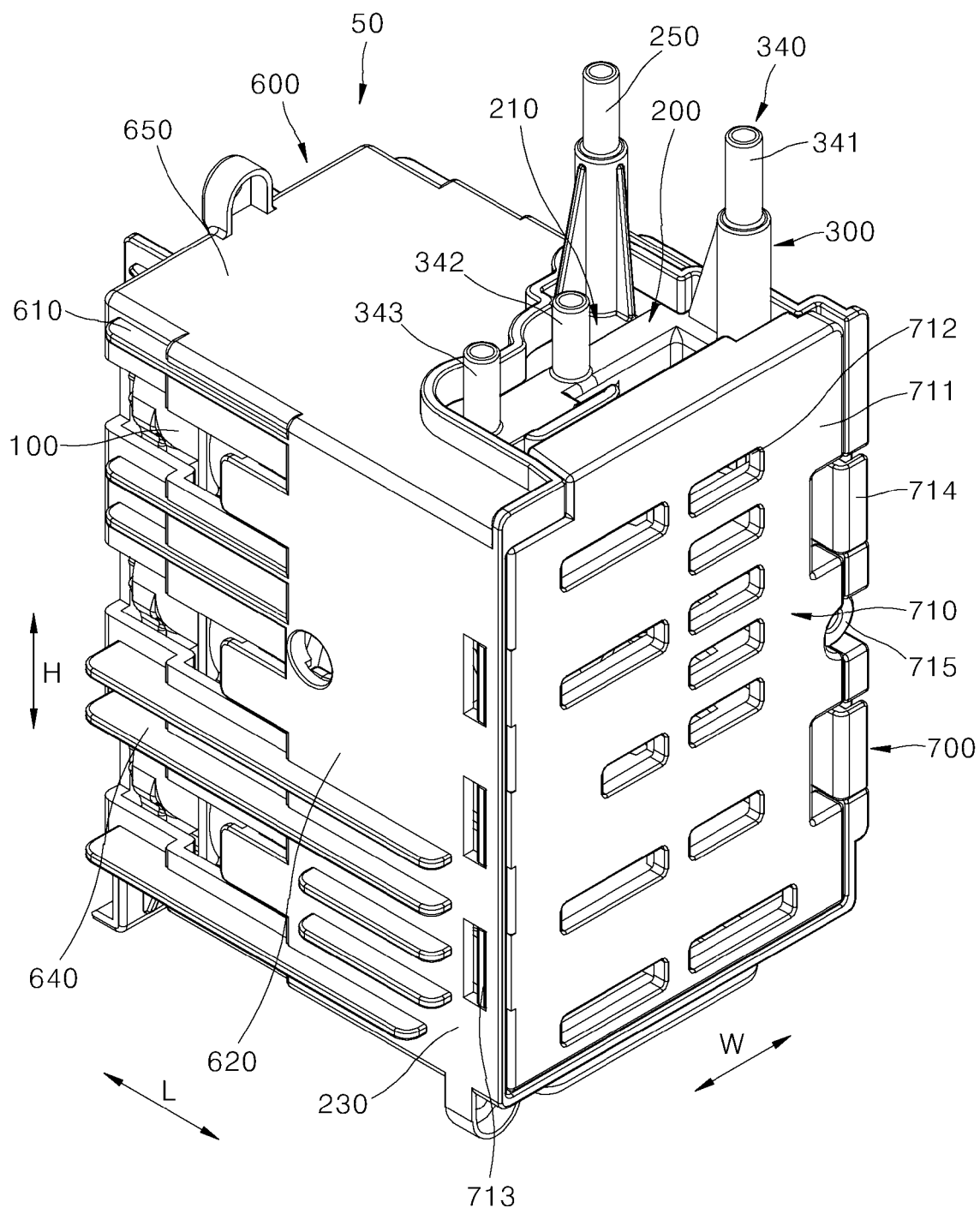
FIG. 4 is a perspective diagram illustrating a case according to one embodiment that is surrounding a valve and an integrated waterway part.
Figure 5:
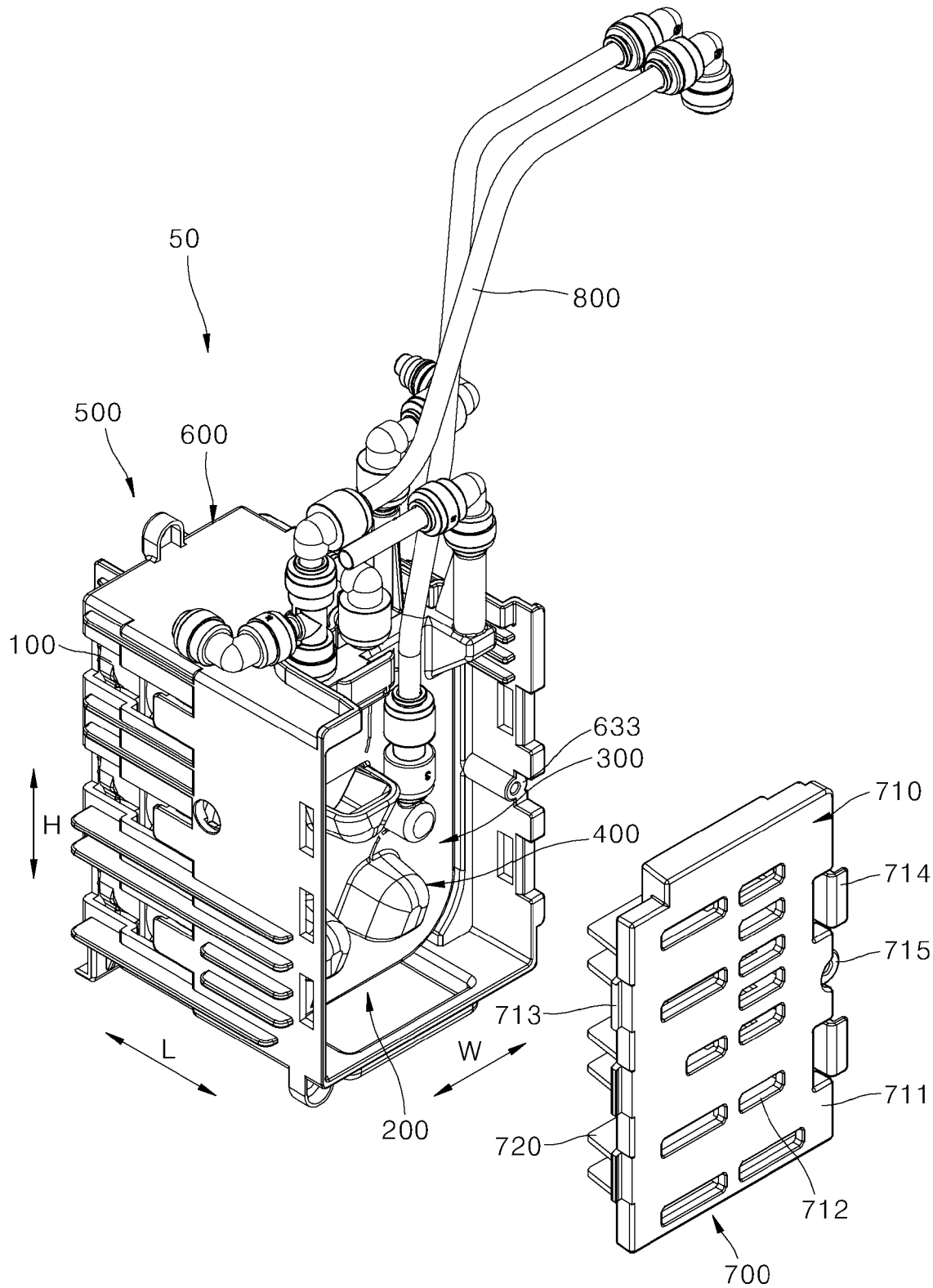
FIG. 5 is a perspective diagram illustrating a door according to one embodiment that is disassembled from a case body.
Figure 6:
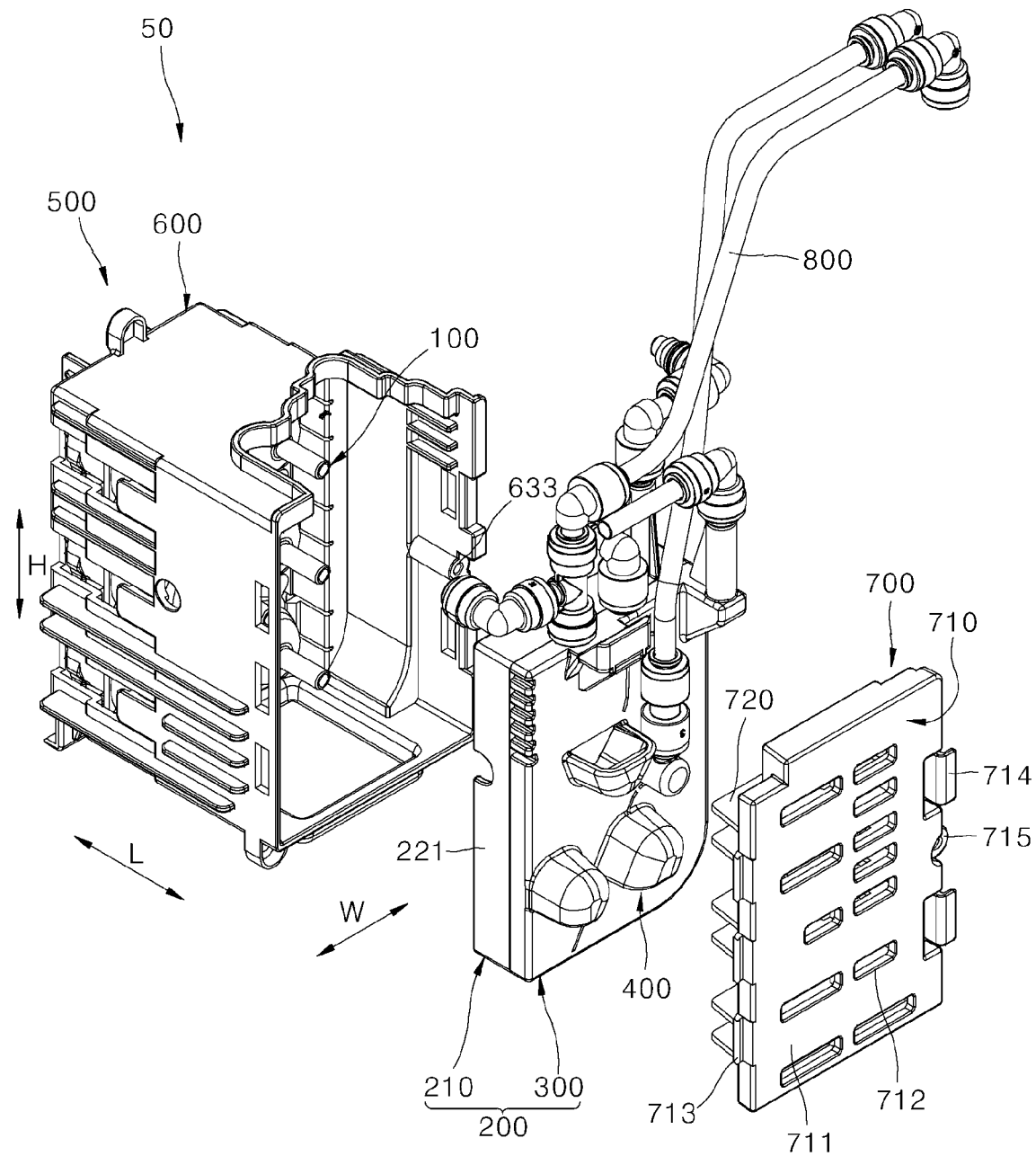
FIG. 6 a perspective diagram illustrating an integrated waterway part according to one embodiment that is disassembled from a valve.
Figure 7:
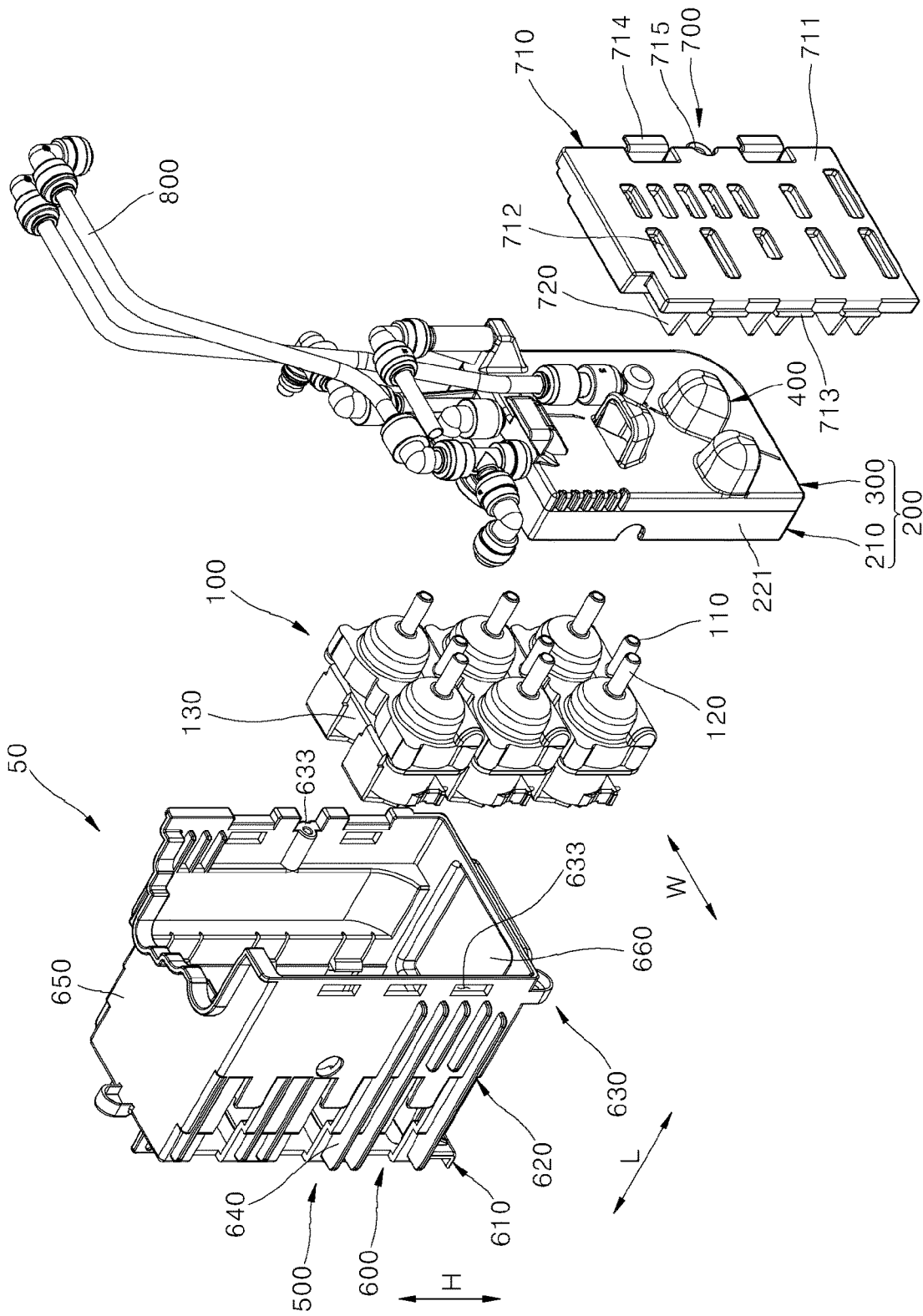
FIG. 7 is a perspective diagram illustrating a state where a case, a valve and an integrated waterway part according to one embodiment are disassembled.

FIG. 4 is a perspective diagram illustrating a case 500 according to one embodiment that is surrounding a valve 100 and an integrated waterway part 200. FIG. 5 is a perspective diagram illustrating a door 700 according to one embodiment that is disassembled from a case body 600. FIG. 6 a perspective diagram illustrating an integrated waterway part 200 according to one embodiment that is disassembled from a valve 100. FIG. 7 is a perspective diagram illustrating a state where a case 500, a valve 100 and an integrated waterway part 200 according to one embodiment are disassembled.

As shown in FIGS. 4 to 7, a direct water pipe module 50 may be configured of a case 500, an integrated waterway part 200 and a valve 100. To disassemble the direct water pipe module 50, a door 700 provided in the case 500 may be disassembled first.

The integrated waterway part 200 may be moved in one direction and coupled to the valve 100. In this state, the case 500 may be installed in a shape surrounding the valve 100 to compose the direct water pipe module 50. The case 500 of the direct water pipe module 50 may be configured to cover the valve 100 and the integrated waterway part 200 such that the moving of the integrated waterway part 200 farther from the valve 100 by means of a water pressure may be blocked enough to prevent water leak between the integrated waterway part 200 and the valve 100.

The case 500 may include a case body 600 and the door 700. The door 700 may be configured to open and close a front of the case body 600. The door 700 for opening closing a front opening 602 of the case 500 may be hingedly coupled or fitted to the case body 600 or secured thereto by hooking.

The valve 100 may be disposed in the case body 600 to restrict the moving of the valve 100. The direct water pipe module 500 may be moved along a longitudinal direction L of the case 500 such that a waterway shaped water inlet 110 and water outlet 120 protruded to a front of the valve 100 may be inserted in the integrated waterway part 200.

The door 700 coupled to the case body 600 may support the integrated waterway part 200 such that it may prevent the integrated waterway part 200 from escaping from the valve 100. When the water purifier 1 is used, the inside of the integrated waterway part 200 might be contaminated and it requires a periodic replacement of the integrated waterway part 200. In case of replacing or repairing the integrated waterway part 200, a user may decouple the door 700 from the case body 600 and then move the integrated waterway part 200 in a linear direction, with holding a handle 400, to pull out it outside the case body 600 quickly and smoothly.

[Specific Configuration of the Water Purifier Components]
[Case]

Figure 8:
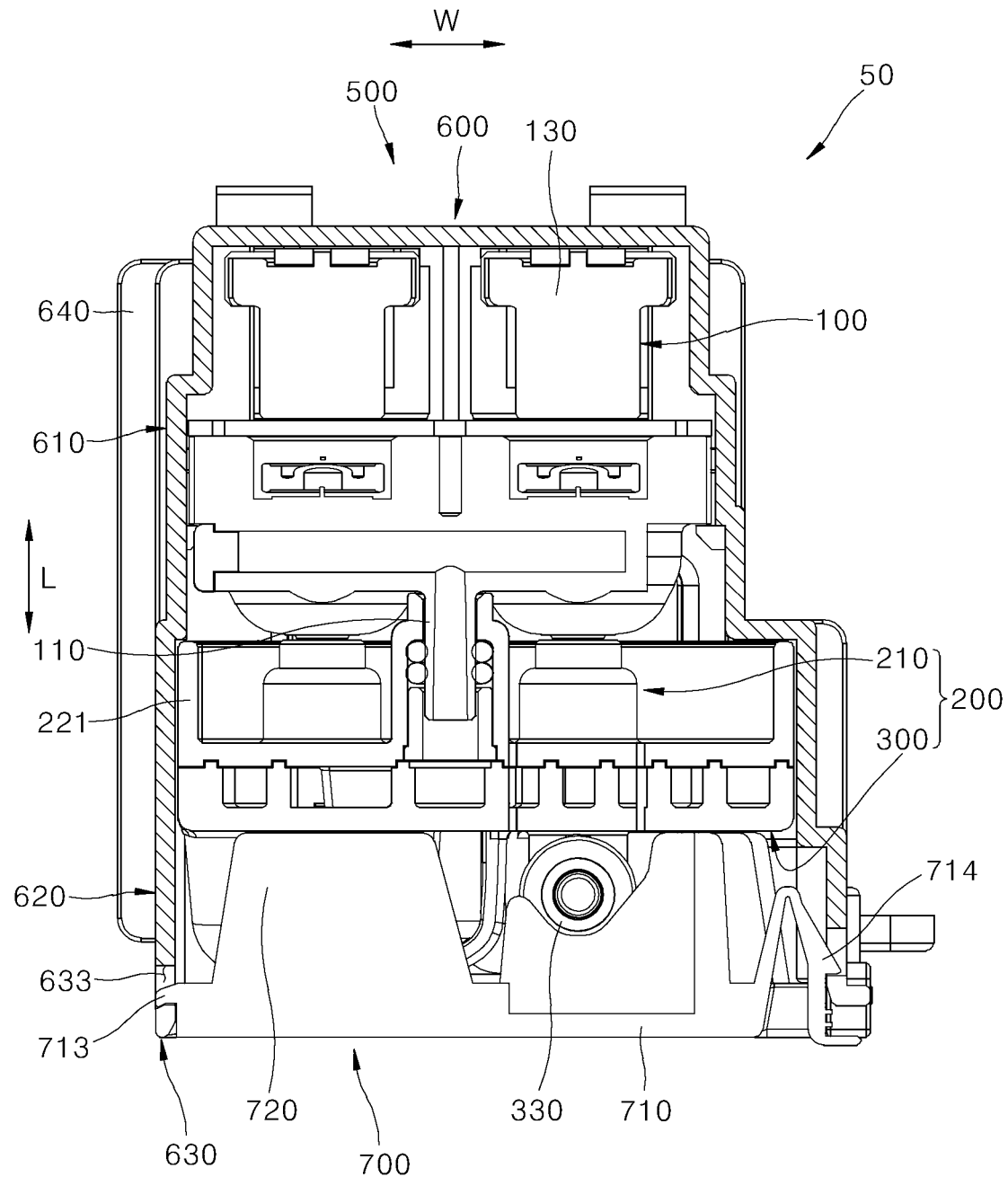
FIG. 8 is a plane view illustrating that an integrated waterway part according to one embodiment is connected to a valve.
Figure 9:
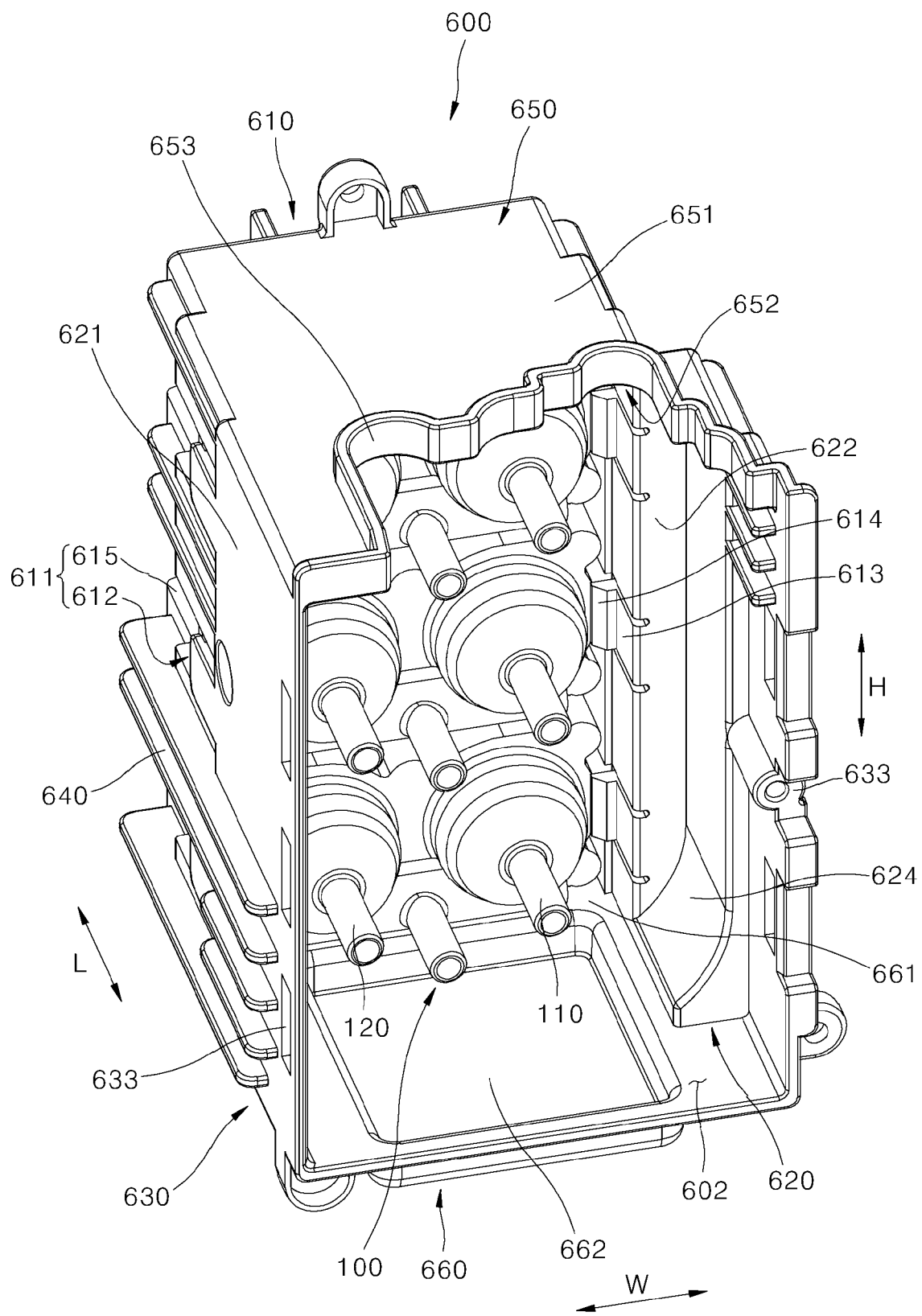
FIG. 9 is a perspective diagram illustrating a valve according to one embodiment that is installed in a case body.
Figure 10:
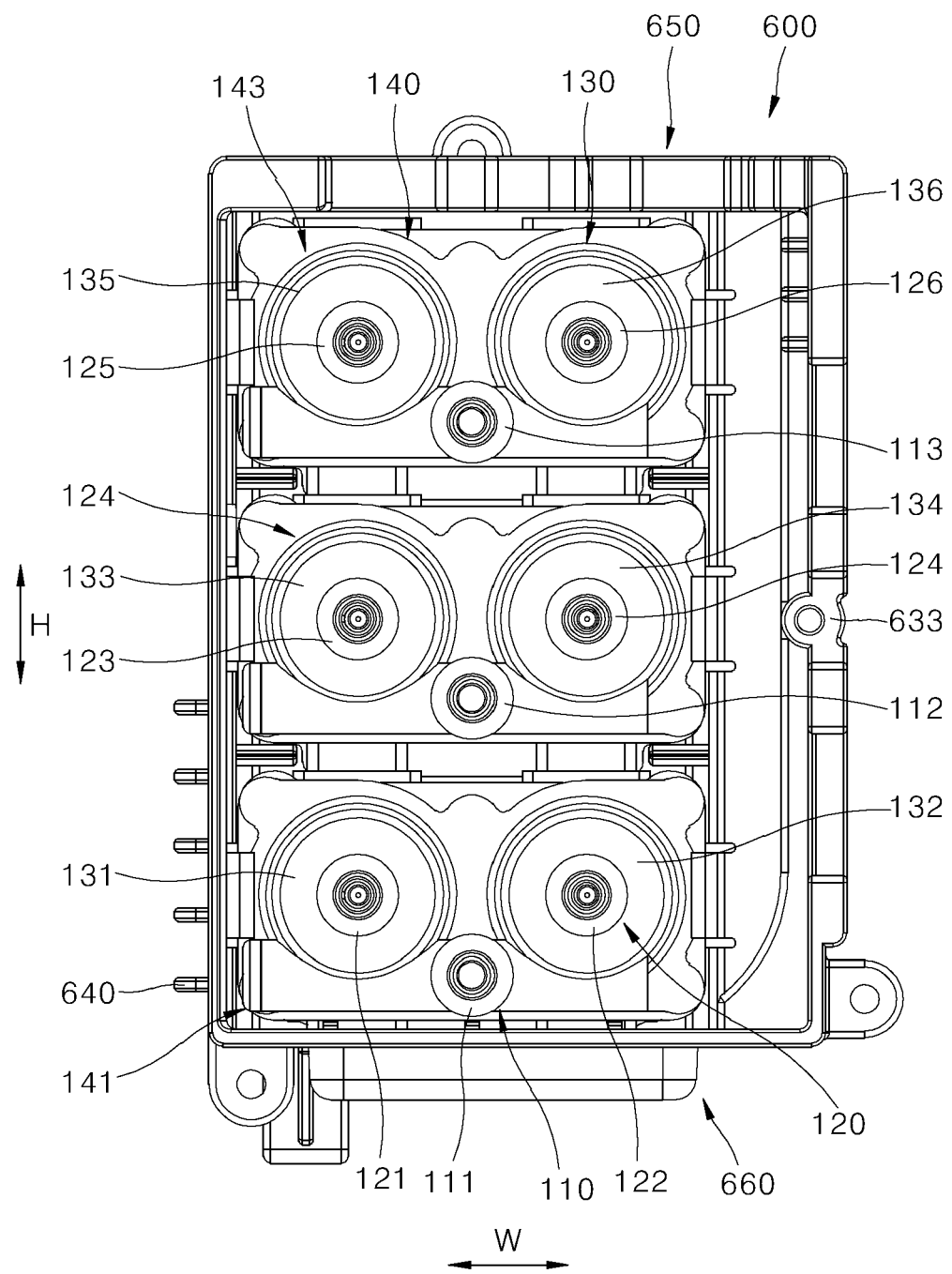
FIG. 10 is a front view illustrating a valve according to one embodiment that is installed in a case body.

FIG. 8 is a plane view illustrating that the integrated waterway part 200 according to one embodiment is connected to the valve 100. FIG. 9 is a perspective diagram illustrating the valve 100 according to one embodiment that is installed in the case body 600. FIG. 10 is a front view illustrating the valve 100 according to one embodiment that is installed in the case body 600.

As shown in FIGS. 8 to 10, the case 500 may be installed in the shape surrounding the valve 100 and the integrated waterway part 200, in a state of being coupled to them. As needed, various modifications may be possible in a scope of a technical feature in that the integrated waterway part 200 may be exposed outside by opening and closing the opening of the case 500.

The door 700 provided in the case 500 may press or support the integrated waterway part 200 in a direction toward the valve 100. Accordingly, when the integrated waterway part 200 coupled to the valve 100 is moved in a direction getting farther from the valve 100 by a water pressure. The case 500 including the case body 600 and the door 700 may prevent the integrated waterway part 200 fittedly joint to the valve 100 from being moved farther from the valve 100 by the water pressure and also block water leak between the integrated waterway part 200 and the valve 100.

The case 500 according to one embodiment may have an open side to facilitate the pulling out or replacement of the integrated waterway part 200. Accordingly, after the open side of the case 500 which faces the integrated waterway part 200 is open, the waterway part 200 may be detachably moved from the valve 100.

The case 500 according to one embodiment may include the case body 600 and the door 700.

[Case Body]

Figure 11:
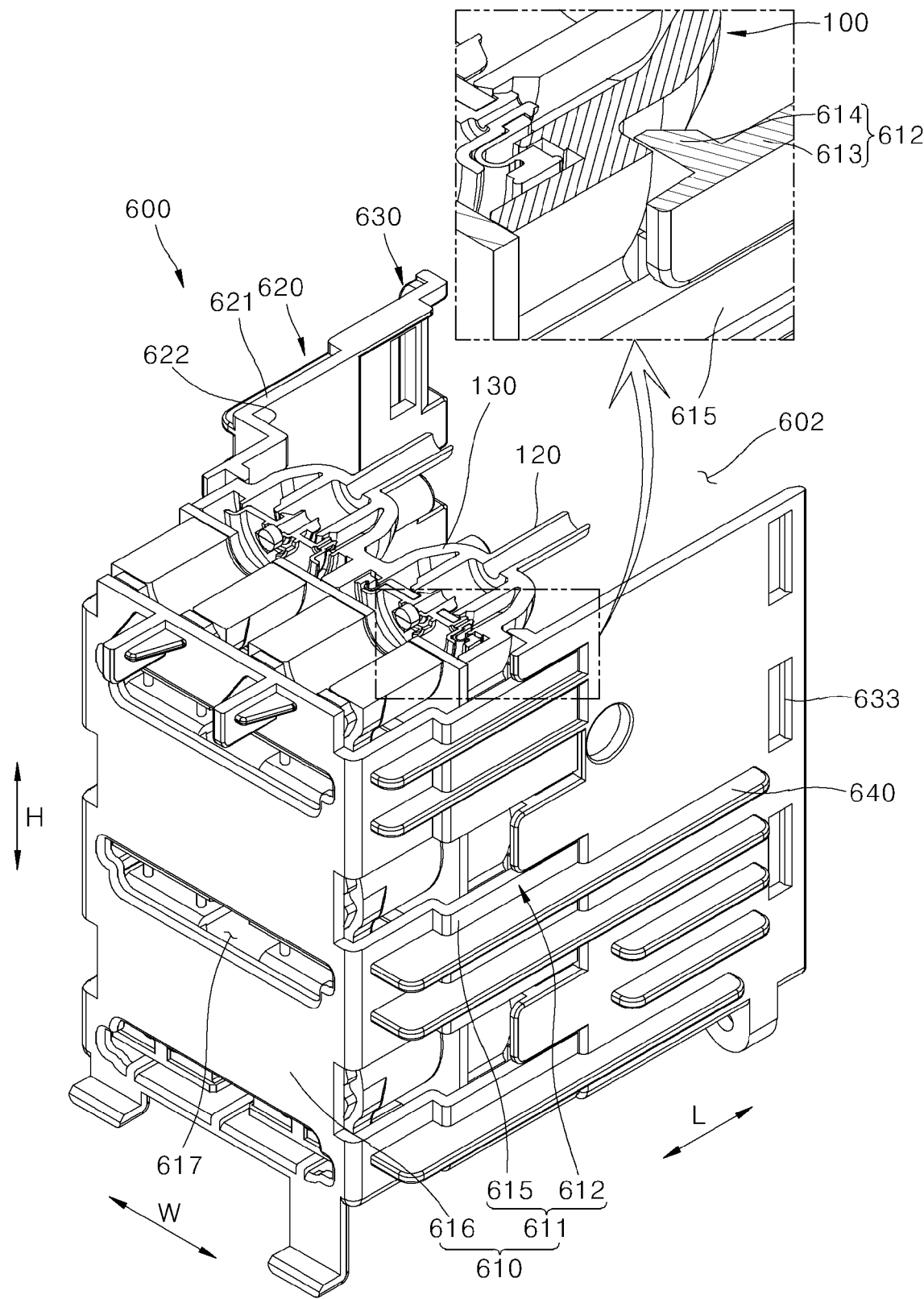
FIG. 11 is a partially cut-away perspective diagram illustrating a valve according to one embodiment that is installed in a case body.
Figure 12:
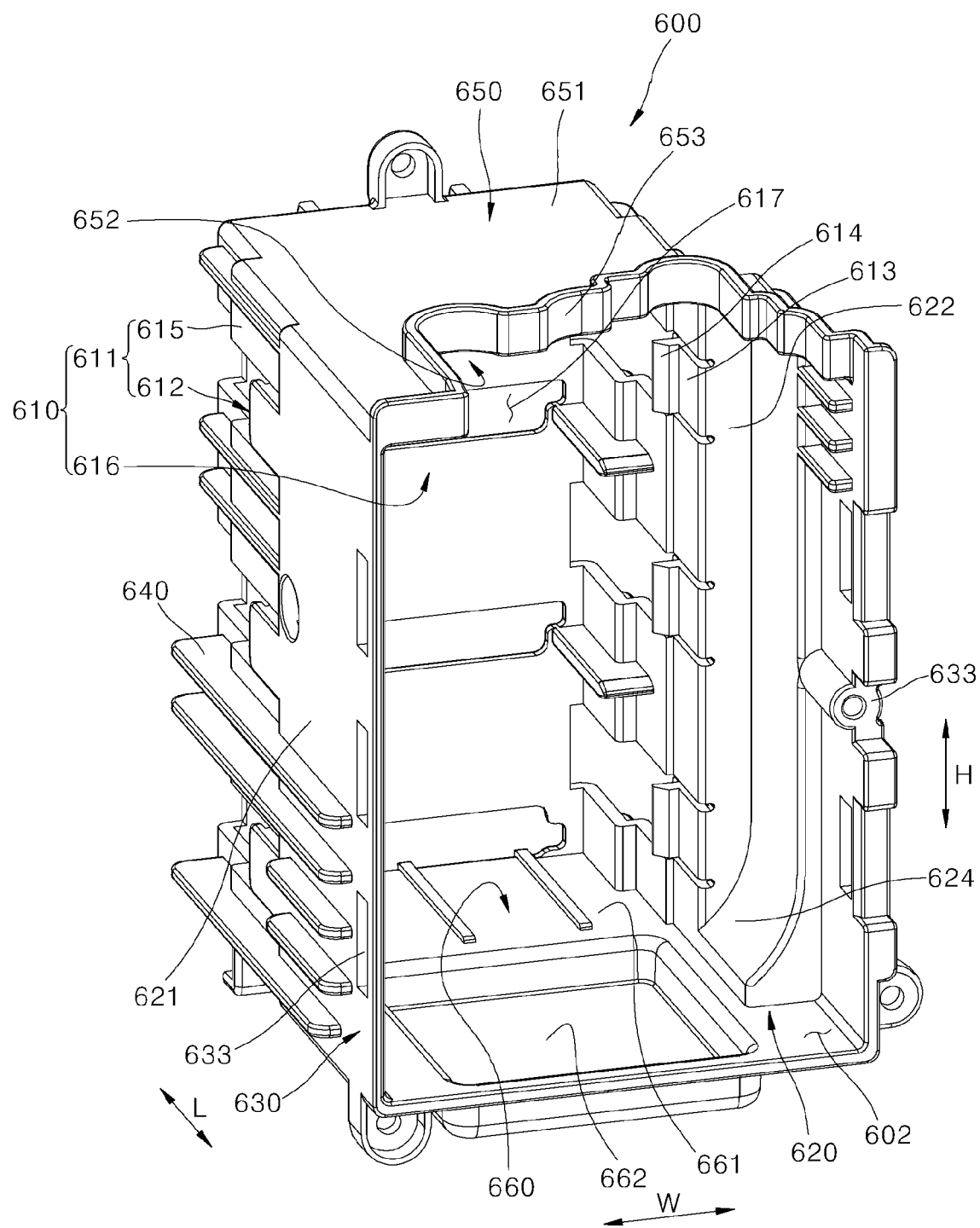
FIG. 12 is a perspective diagram illustrating a case body according to one embodiment.

FIG. 11 is a partially cut-away perspective diagram illustrating the valve 100 according to one embodiment that is installed in the case body 600. FIG. 12 is a perspective diagram illustrating the case body 600 according to one embodiment.

As shown in FIGS. 11 and 12, the case body 600 may be installed in the shape surrounding the valve 100 and the integrated waterway part 200, except the portion directed to decouple the integrated waterway part 200. One side of the case body 600 may be open and form a front opening 602. The moving of the integrated waterway part 200 may be performed through the front opening 602.

The case body 600 according to one embodiment may be installed to rear and lateral surfaces of the valve 100. Also, the case body 600 may be installed to surround both lateral surfaces of the integrated waterway part 200. The case body 600 may be provided to cover both lateral surfaces of the integrated waterway part 200, without any auxiliary upper or lower cover. Various structural changes may be applicable to the case body 600.

The valve 100 may be disposed in the case body 600 and moving may be restricted. The integrated waterway part 200 configured to move a front-back direction through the front opening 602 of the case body 600 may be coupled to the valve 100.

The case body 600 according to one embodiment may include at least one of a valve disposing portion (or valve assembly disposing portion) 610, a waterway disposing portion (or liquid way assembly disposing portion) 620, a door connecting portion, a reinforcing rib 640, a case cover 650, a case base 660, a door body 710 or an anti-separation rib 720.

The valve disposing portion 610 may receive the valve 100 and be formed in a shape cover both traverse-direction lateral surfaces and a rear surface of the valve 100, while defining a rear portion of the case body 600. The valve disposing portion 610 according to one embodiment may be formed in a square tube having an open front and extending a vertical direction (H) such that a plurality of valves 100 may be disposed vertically.

The valve 100 moved from a front area to a rear area of the valve disposing portion may be positioned in the valve disposing portion 610 and hooked on a valve hook 614 provided in the valve disposing portion 610 to restrict the forward moving of the valve 100. The valve disposing portion 610 according to one embodiment may include a valve restricting frame 611 and a frame connecting portion (or frame connecting wall) 616.

The valve restricting frame 611 may be provided in both traverse-direction sides of the valve 100 and configured to restrict the moving of the valve 100 disposed in the valve disposing portion 610. In addition, the valve restricting frame 611 may be formed in a plate shape or a plate-similar shape and provided in each width-direction W sides of the valve 100, extending vertically. Two valve restricting frames 611 may be provided in respective sides of the valve 100, in parallel to each other. The valve restricting frame 611 according to one embodiment may include a valve securing protrusion 612 and a valve support panel 615.

The valve securing protrusion 612 may be extended from the waterway disposing portion 620 and various modifications may be applicable within a scope of the technical feature in that a protrusion projected toward the case body 600 is hooked on the valve 100 to restrict the moving of the vale 100. The valve securing protrusion 612 may include an extended support piece (or extended support plate) 613 and a valve hook 614.

The extending support piece 613 may be formed in a plate shape rearwardly extending from the waterway disposing portion 620 toward the frame connecting portion 616. The extending support piece 613 may be injection-molded of plastic. When one end of the extending support piece 613 is pulled outwardly from the valve 100, temporary warping is likely to occur in the extending support piece 613.

The valve securing protrusion 612 may be protruded from the extending support piece 613 and hook an outer surface of the valve 100 to restrict the forward moving of the valve 100. The extending support piece 613 and the valve securing hook 614 may be integrally molded as one body and formed of injection molding such that it might be temporarily curved when the user pulls the extending support piece 613.

When one end of the extending support piece 613 is moved in a direction getting farther from the valve 100, the valve securing hook 614 may be likely to get distant from the valve enough to release the restriction of the valve 100.

The valve securing hook 614 projected from the inside of the extending support piece 613 may hook the outer surface of the valve 100 to restrict the moving of the valve 100. As the valve securing hook 614 is spaced a preset distance apart from one end of the extending support piece 613, the user may hold the inner area of the extending support piece 613 and move it to the direction opposite to the valve 100.

The valve support panel 615 may be spaced apart from the valve securing protrusion 612 and extended in a longitudinal direction L of the valve 100, and configured to connect the waterway disposing portion 620 and the frame connecting portion 616 with each other. Various modifications may be applied within a scope of the technical feature mentioned above. The valve support panel 615 according to one embodiment may stand in both traverse-direction sides of the valve 100 and formed in a plate shape having a stepped area along an exterior of the valve 100.

The frame connecting portion 616 may be extended along the traverse direction W of the valve 100 and various modifications may be applied within a scope of the technical feature of connecting ends of the valve restricting frame 611. The frame connecting portion 616 according to one embodiment may stand in a rear area of the valve 100. The valve restricting frame 611 and one end of the valve support panel 615 may be connected to both traverse-direction L sides of the frame connecting portion 616.

The frame connecting portion 616 may be provided in a position facing a rear area of the valve 100. The frame connecting portion 616 may include a plurality of wire holes 617 may be connected to the valve 100 to install wires. A wire hole 617 may be formed in a horizontal direction or multiple wire holes may be formed in a vertical direction.

The waterway disposing portion 620 may be extended from the valve disposing portion 610. Various modifications may be applied within a scope of the technical feature of defining the case provided in the integrated waterway part 200. The waterway part 200 according to one embodiment may include an extension frame 621 and an inner projected portion 624.

The extension frame 621 may be provided in the traverse-direction W sides of the integrated waterway part 200 and extended in a longitudinal direction L of the case body 600, to connect the valve disposing portion 610 and the door connecting portion 630 with each other. Also, the extension frame 621 may have a hooking projection 622 formed in a border area with an inner area of the valve disposing portion

610 and configured to hook the integrated waterway part 200 thereto. The extension frame 621 may include the hooking projection 622 formed in the border area with the valve disposing portion 610 and the integrated waterway part 200 moved to the inside of the case body 600 through the front opening 602 may be hooked on the hooking projection 622 such that the additional moving toward the valve 100 may be restricted.

The inner projected portion 624 according to one embodiment may be projected from a lateral surface of the integrated waterway part 200 and configured to prevent its shaking inside the waterway disposing portion 620. The inner projected portion 624 may be positioned in the extension frame 621 facing the lateral surface of the integrated waterway part 200 and extended vertically.

When a lower edge area of the integrated waterway part 200 is convex-shaped, the inner projected portion 624 in contact with the lower edge of the integrated waterway part 200 may be formed in a concave-shaped.

The door connecting portion 630 may be extended to a front area of the waterway disposing portion 620. Various modifications may be applied within a scope of the technical feature in that the door connecting portion 630 is connected with the door 700. The door connecting portion 630 according to one embodiment may stand in traverse-direction W sides of the case body 600 and include a groove for being coupled to the door 700. In addition, the door connecting portion 630 may include a fix-securing hole 633 having a female thread.

The reinforcing rib 640 may be outwardly protruded from at least one of the valve disposing portion 610, the waterway disposing portion 620 and the door connecting portion 630, and it may be extended along a longitudinal direction L of the case body 600. The reinforcing rib 640 may be formed in a square plate shape that is protruded outwardly with respect to the case body 600, and it may be installed in a horizontal direction. The reinforcing rib 640 may be provided in the other area except the area where the valve securing protrusion 612, and connect the valve disposing portion 610 with the waterway disposing portion 620 or the valve disposing portion 610 and the waterway disposing portion 620 with the door connecting portion 630, to enhance structural rigidity.

The case cover 650 may be provided to cover an upper area of the vale 100 and the integrated waterway part 200. The case cover 650 may be connected to at least one of the valve disposing portion 610, the waterway disposing portion 620 or the door connecting portion 630. In addition, the case cover 650 may cover upper areas of the valve 100, the integrated waterway part 200 and the door connecting portion 630. Various modifications including the above-mentioned examples may be applicable. The case cover 650 according to one embodiment may include at least one of a first cover plate 651, a guide groove 652 or a rigidity reinforcing protrusion 653.

The first cover plate 651 may be formed in a plate shape covering upper areas of the valve 100 and the integrated waterway part 200. Also, the first cover plate 651 may define an upper surface of the case body 600.

The guide groove 652 may be configured of a groove formed in the first cover plate 651 and a connecting pipe 800 connected to the integrated waterway part 200 may be disposed in the guide groove 652. The connecting pipe 800 connected to the integrated waterway part 200 may be extended to the upper area of the integrated waterway part 200 and the guide groove 652 may be formed to avoid the interference of the connecting pipe 800 with the case cover 650. The position of the guide groove 652 may be corresponding to that of the connecting pipe 800.

The rigid reinforcing protrusion 653 may be extended along a border area between the first cover plate 651 and the guide groove 652, and projected upward or downward with respect to the first cover plate 651. The rigidity reinforcing protrusion 653 according to one embodiment may be formed in a protrusion shape upwardly extended from one end of the first cover plate 651 to enhance the structure rigidity of the case cover 640.

In addition, various modifications of the case base 660 may be applicable within a scope of a technical feature in that the case base 660 is connected to at least one of the valve disposing portion 610, the waterway disposing portion 620 or the door connecting portion 630, while covering lower areas of the valve 100 and the integrated waterway part 200. The case base 660 according to one embodiment may include a second cover plate 661 and a water drip tray 662.

The second cover plate 661 may be formed in a plate shape for covering the lower areas of the valve 100 and the integrated waterway part 200. The second cover plate 661 may cover lower areas of the valve disposing portion 610, the waterway disposing portion 620 and the door connecting portion 630. In addition, the second cover plate 661 may be connected to the lower areas of the valve disposing portion 610, the waterway disposing portion 620 and the door connecting portion 630, and extended in the longitudinal direction L of the case body 600.

The water drip tray 662 may define a concave area formed in the second cover plate 661 facing the connecting portion between the valve 100 and the integrated waterway part 200. Accordingly, the water drip tray 662 may collect falling water. When the integrated waterway part 200 is disassembled from the valve 100, water leaking between the valve 100 and the integrated waterway part 200 may fall to be stored in the water drip tray 662.

[Door]

Figure 13:
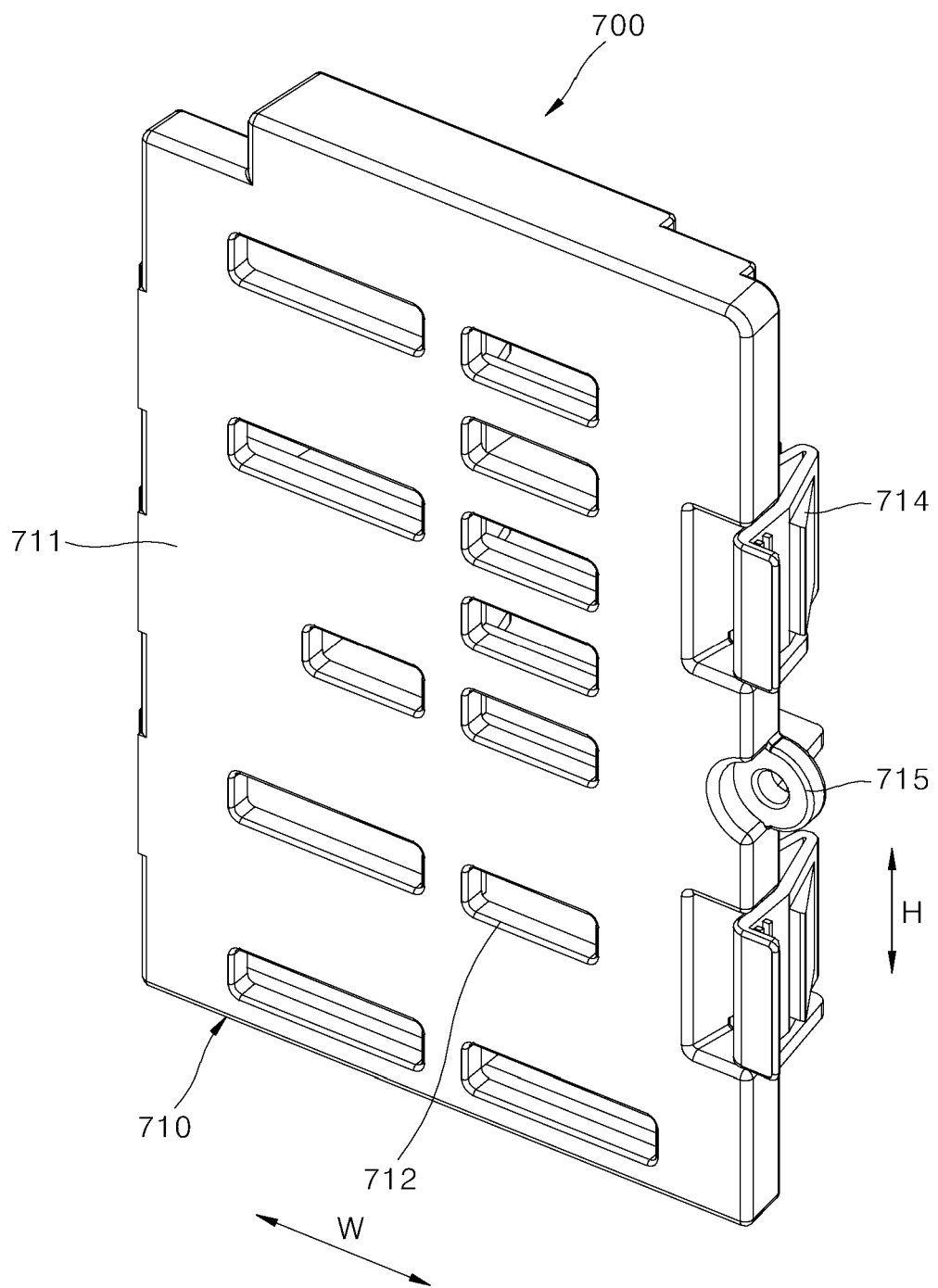
FIG. 13 is a perspective diagram illustrating a front surface of a door according to one embodiment.
Figure 14:
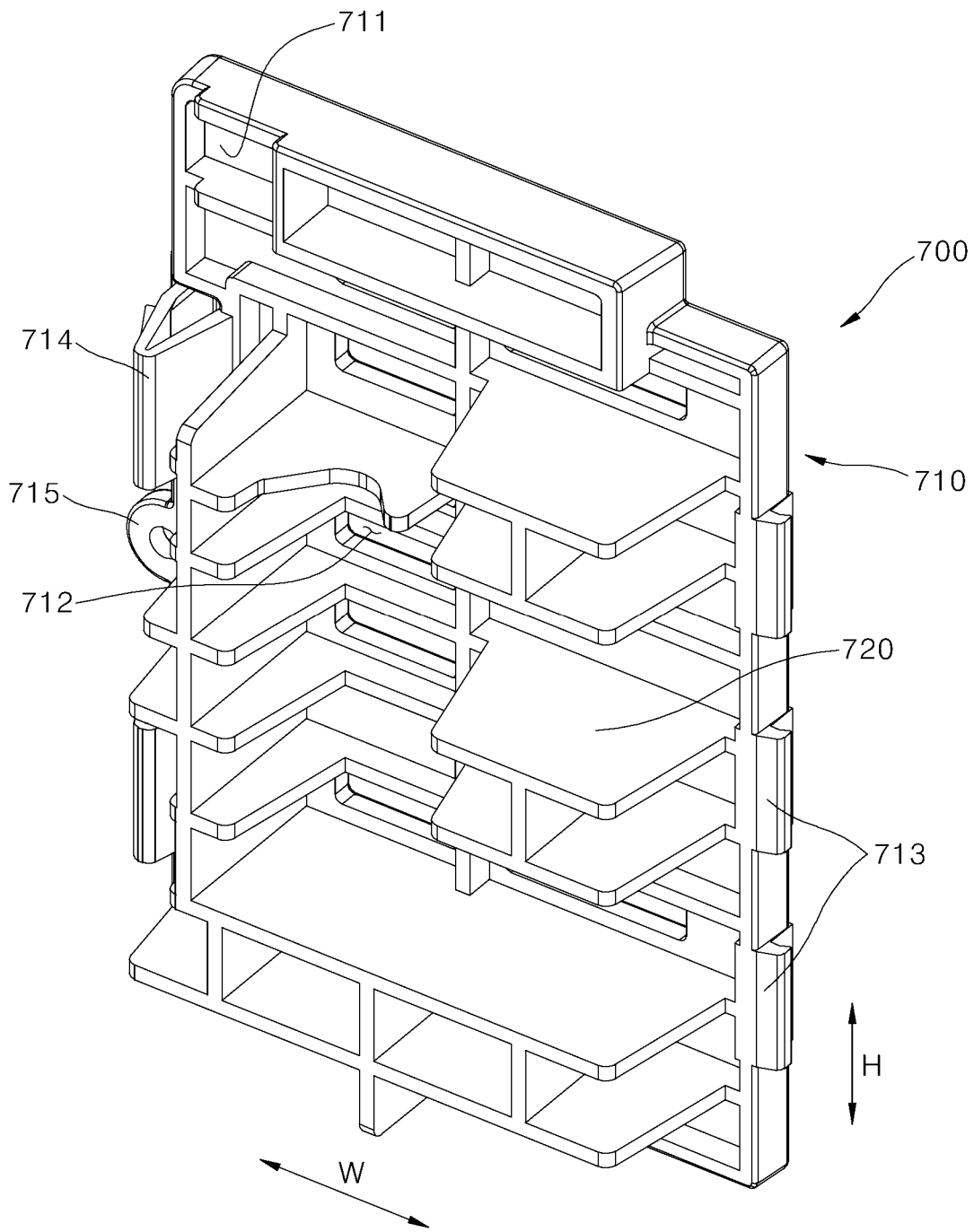
FIG. 14 is a perspective diagram illustrating a rear surface of a door according to one embodiment.

FIG. 13 is a perspective diagram illustrating a front surface of the door 700 according to one embodiment. FIG. 14 is a perspective diagram illustrating a rear surface of the door 700 according to one embodiment.

As shown in FIGS. 13 and 14, various modifications may be applicable to the door 700 within a scope of a technical feature in that the door 700 connected to the case body 600 opens and closes the front opening 602. The door 700 may be provided in a position facing the integrated waterway part 200 and configured to support the integrated waterway part 200, in a state of closing the front opening 602. The door according to one embodiment may include a door body 710 and an anti-separation rib 720.

The door body 710 may be detachably coupled to the door connecting portion 630 of the case body 600 and various modifications may be applicable within a scope of the technical feature in that the door body 710 may open and close the front opening 602 of the case body 600. The door body 710 according to one embodiment may include at least one of a door plate 711, a cover securing protrusion 713, a securing hook 714 or a move-securing hole 715.

The door plate 711 may be formed in a plate shape to stand in the door connecting portion 630.

A water leak check portion may have a through hole that passes through the door plate 711 and allow the user to check water leak in the integrated waterway part 200. The water leak check portion according to one embodiment may include a plurality of slot holes formed in the door plate 711. The water leak check portion may be extended along a width direction W of the door plate 711. Accordingly, the user may observe presence of water leak between the integrated waterway part 200 and the valve 100, while the structural rigidity of the door plate 711 is maintained.

The cover securing protrusion 713 may be projected to a preset width direction W area of the door plate 711 and inserted in the case body 600. The cover securing protrusion 713 according to one embodiment may be provided in one width direction area W of the door plate 711 and the securing hook 714 may be provided in the other width direction W area of the door plate 711. A plurality of cover securing protrusions 713 may be projected along the door plate 711 vertically and inserted in the groove provided in the door connecting portion 630 to be secured. In a state where the door 700 is coupled to the door connecting portion 630, the cover securing protrusion 713 may be inclinedly projected to the front. Accordingly, when the integrated waterway part 200 forwardly presses the door 700 by means of the water pressure, the cover securing protrusion 713 may be provided in a back gradient shape and hooked on the door connecting portion 630 such that the separation of the door 700 from the door connecting portion 630 by means of the water pressure may be prevented.

The securing hook 714 may be protruded to the other width direction W area of the door plate 711. Various modifications may be applicable to the securing hook within a scope of a technical feature in that the securing hook 714 is formed in a hook shape and secured to the case body 600. A plurality of securing hooks 714 may be installed in the other width direction W area of the door body 710 according to one embodiment and elastically deformable to be coupled to or decoupled from the door connecting portion 630.

The move-securing hole 715 may be configured of a hole passing through the door body 710 and provided in a position facing the securing hole 633 provided in the door connecting portion 630. When the door 700 is coupled to the door connecting portion 630, the move-securing hole 715 and the fix-securing hole 633 may face each other in communication. Accordingly, an auxiliary fastening bolt is secured to the fix-securing hole 633 through the move-securing hole 713 such that the coupling force of the door 700 may be improved. A female thread may be provided in each of the move-securing hole 715 and the fix-securing hole 633.

The anti-separation rib 720 may be extended from the door body 710 toward the integrated waterway part 200 and support the integrated waterway part 200 at an opposite position to the valve 100. Various modifications may be applicable within a scope of a technical feature in that

[Valve]

Figure 15:
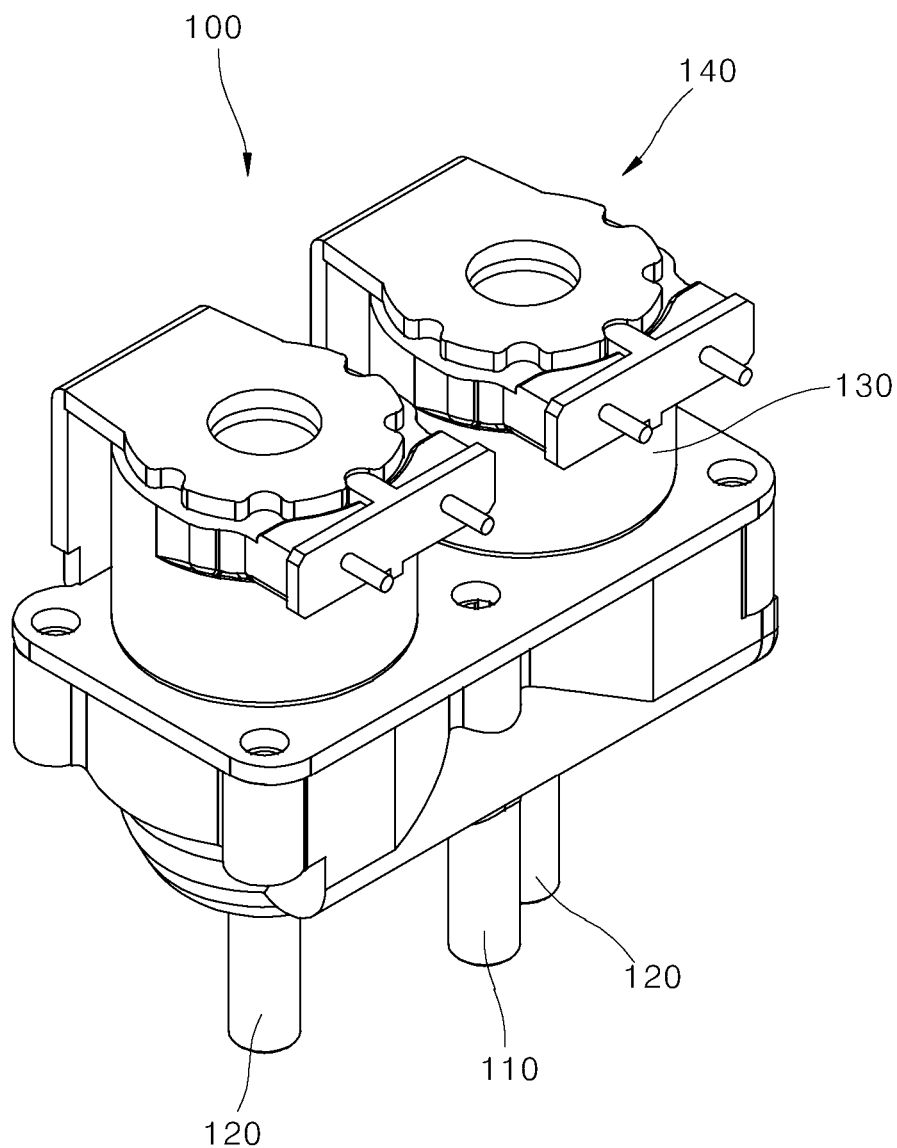
FIG. 15 is a perspective diagram illustrating a valve according to one embodiment.
Figure 16:
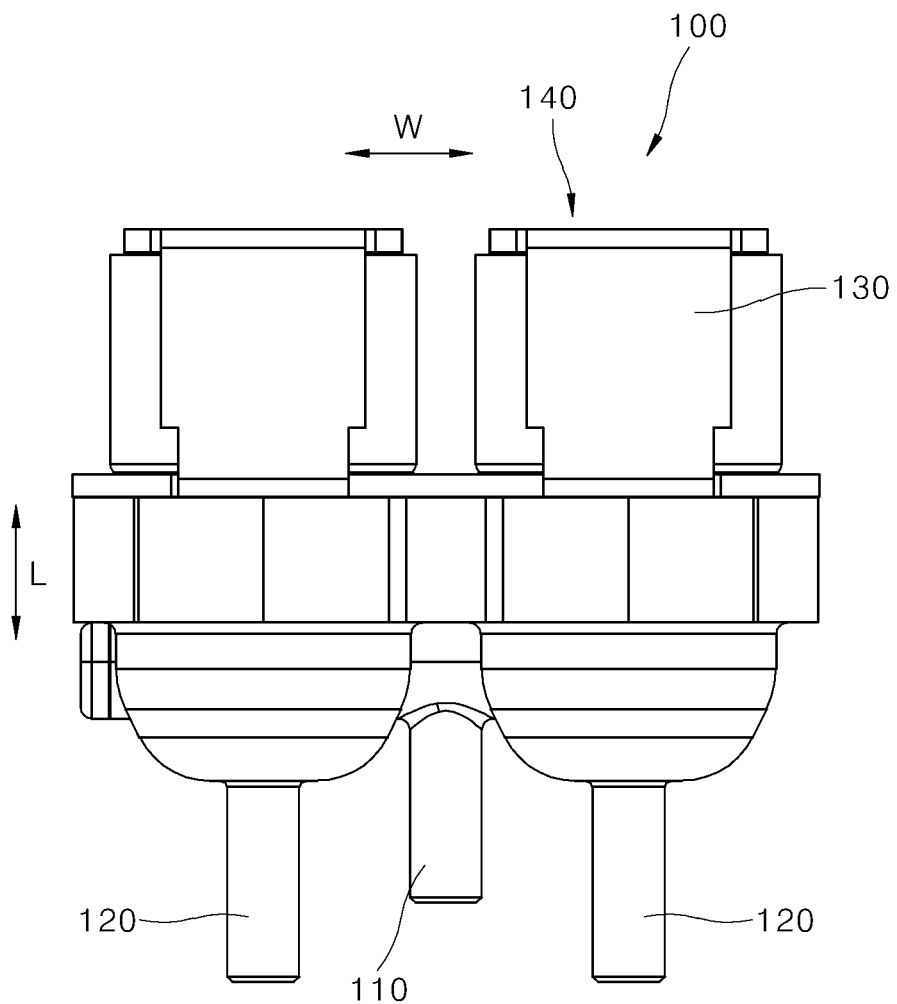
FIG. 16 is a plane view of a valve according to one embodiment.
Figure 17:
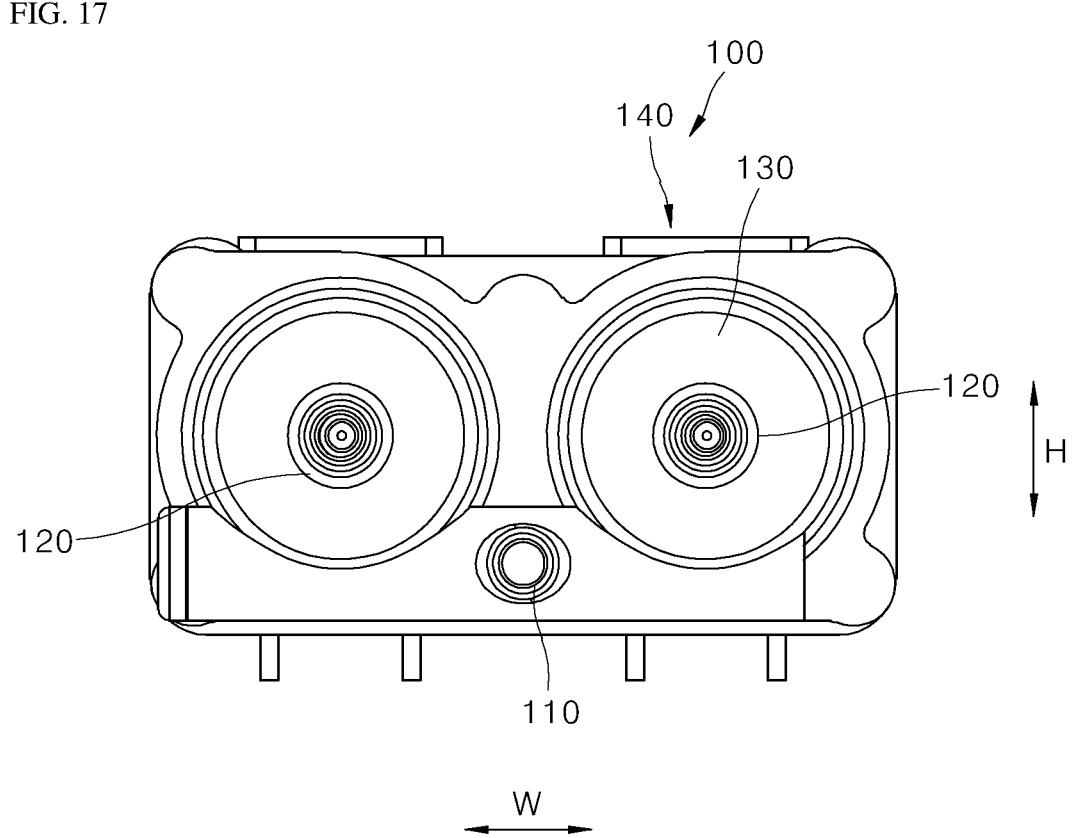
FIG. 17 is a front view of a valve according to one embodiment.

FIG. 15 is a perspective diagram illustrating the valve 100 according to one embodiment. FIG. 16 is a plane view of the valve 100 according to one embodiment. FIG. 17 is a front view of the valve 100 according to one embodiment.

As shown in FIGS. 10 and 15 to 17, the valve 100 may be installed in the case 600 and connected to the integrated waterway part 200, and include a plurality of valves for controlling a direction of water flow. Various modifications may be applicable to the valve within a scope of the above-mentioned technical feature.

The valve 100 according to one embodiment may include a water inlet 110 for receiving water and a plurality of water outlets 120 for discharging water. An actuation valve 130 may be provided in each of the water outlets 120 to adjust a discharge direction of the water drawn via the water inlet 110.

The water inlet 110, the water outlets 120 and the actuation valve 130 may compose a valve module 140. The installation and replacement may be performed in module unit. In addition, a plurality of valve modules 140 may be provided and multilayered in the case 500, and connected to the integrated waterway part 200.

The valve module according to one embodiment may be configured of one water inlet 110 and two water outlets 120. The actuation valve 130 may be installed in each water outlet 120. Accordingly, the valve module 140 may include one water inlet 110, two water outlets 120 and two actuation valves 130.

A plurality of such valve modules 140 may be provided and stacked in the case 500. According to one embodiment, three valve modules 140 may be provided. The lowest one may be a first valve module 141 and a second valve module may be disposed on the first valve module 141. A third valve module 143 may be disposed on the second valve module 142.

Each of the valve modules may include one water inlet 110, two water outlets and two actuation valves 130. A first water inlet 111, a first water outlet 121, a second water outlet 122, a first valve 131 and a second valve 132 may be provided in the first valve module 141. The first water inlet 111, the first water outlet 121 and the second water outlet 122 may be pipe-shaped and extended along a longitudinal direction L of the case 500. The first valve 131 may be connected to the first water outlet 121 and a second valve 132 may be connected to the second water outlet 122.

The water drawn via the first water inlet 111 may flow to the first valve 131 and the second valve 132. Once one of the first and second valves 131 and 132 is put into operation, water may flow toward the actuated valve. For example, the water drawn via the first water inlet 111 may be discharged via the first water outlet 121 by the actuation of the first valve 131. Or, the water drawn via the first water inlet 121 may be discharged via the second water outlet 122 by the actuation of the second valve 132.

The first water outlet 121 and the second water outlet 122 may be disposed over the first water inlet 111. The first water outlet 121 and the second water outlet 122 may be positioned in both width-direction W of the valve 100, respectively. The second valve module 142 and the third valve module 143 may have the same configuration as the first valve module 141.

A second water inlet 112, a third water outlet 123, a fourth water outlet 124, a third valve 133 and a fourth valve 134 may be provided in the second valve module 142. A third water inlet 113, a fifth water outlet 125, a six water outlet 126, a fifth valve 135 and a six valve 136 may be provided in the third valve module 143.

Purified water may be draw via the first water inlet 111. Water for hot water or disinfection may be discharged via the first water outlet 121 and water for purified water or cold water may be discharged via the second water outlet 122.

The water which will be used for cold water or purified water may be drawn via the second water inlet 112. The water which will be used for cold water may be discharged via the third water outlet 123. Water which will be used for purified water may be discharged via the fourth water outlet 124. The third valve 133 may be a cold water valve for adjusting the water discharge for cold water and the fourth valve 134 may be a purified water valve for adjusting the water discharge for purified water.

The water heated for hot water or disinfection is drawn via the third water inlet 113 and the water heated for disinfection may be discharged via the fifth water outlet 125 and the water heated for hot water may be discharged via the sixth water outlet 126. The fifth valve 135 may be a disinfection valve for adjusting the water discharge for disinfection and the sixth valve 136 may be a hot water valve for adjusting the water discharge for hot water.

[Integrated Waterway Part]

Figure 18:
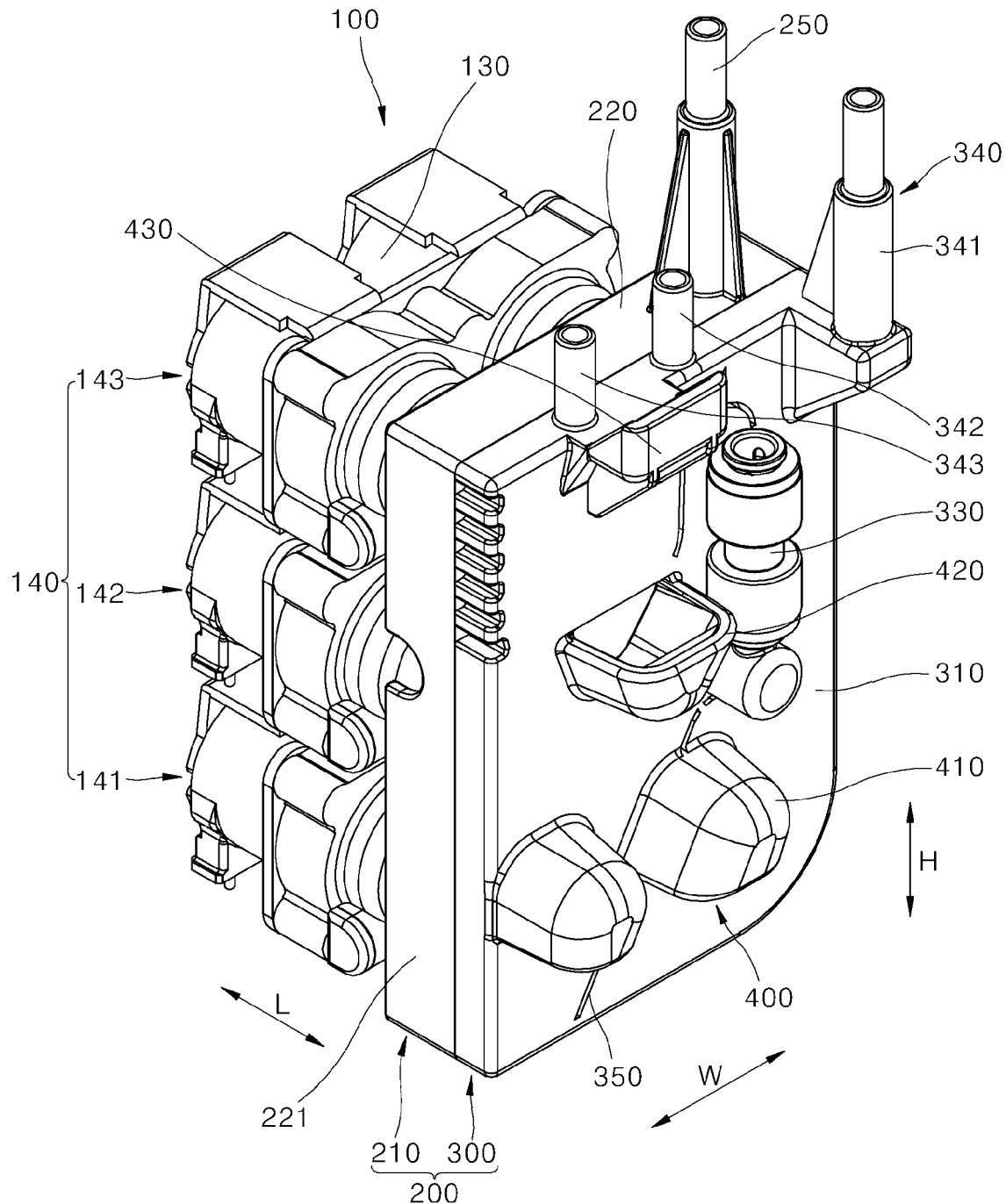
FIG. 18 is a perspective diagram illustrating a state where a valve is connected to an integrated waterway part.
Figure 19:
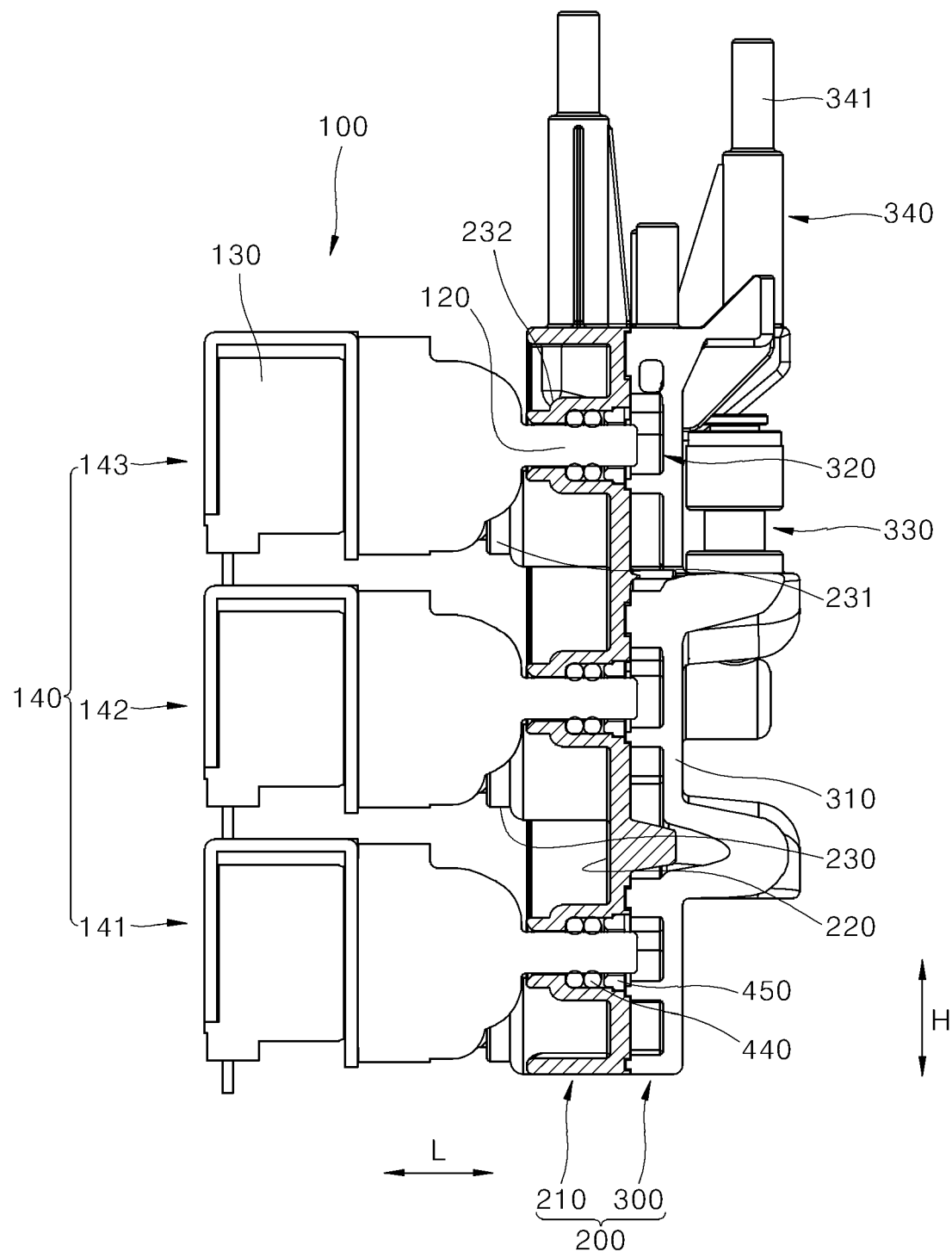
FIG. 19 is a sectional diagram illustrating a valve according to one embodiment.
Figure 20:
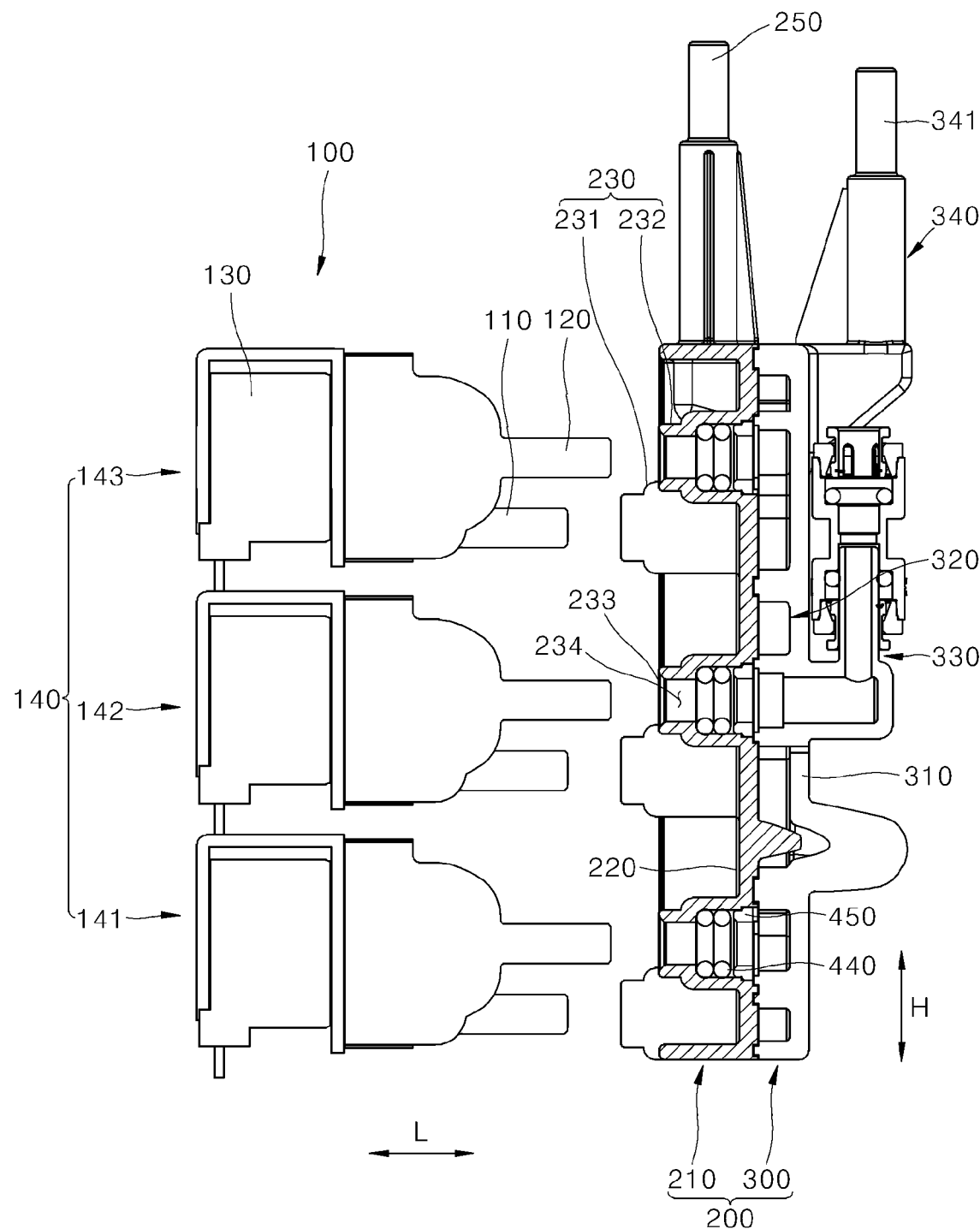
FIG. 20 is a sectional diagram illustrating a state where a valve and an integrated waterway part according to one embodiment are disassembled.
Figure 21:
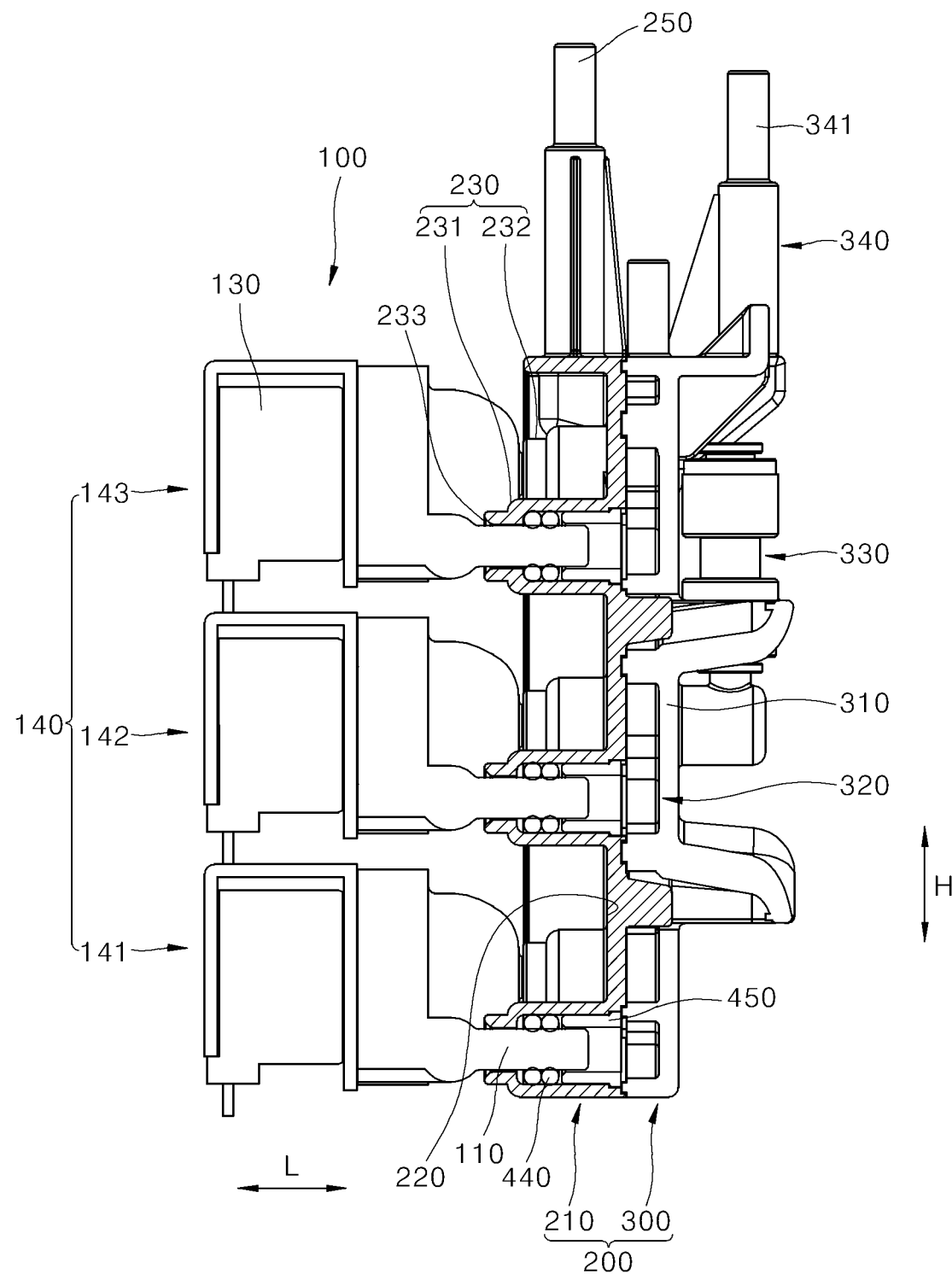
FIG. 21 is a sectional diagram illustrating a valve according to one embodiment that is a water inlet of a valve according to one embodiment is connected to an integrated waterway part.
Figure 22:
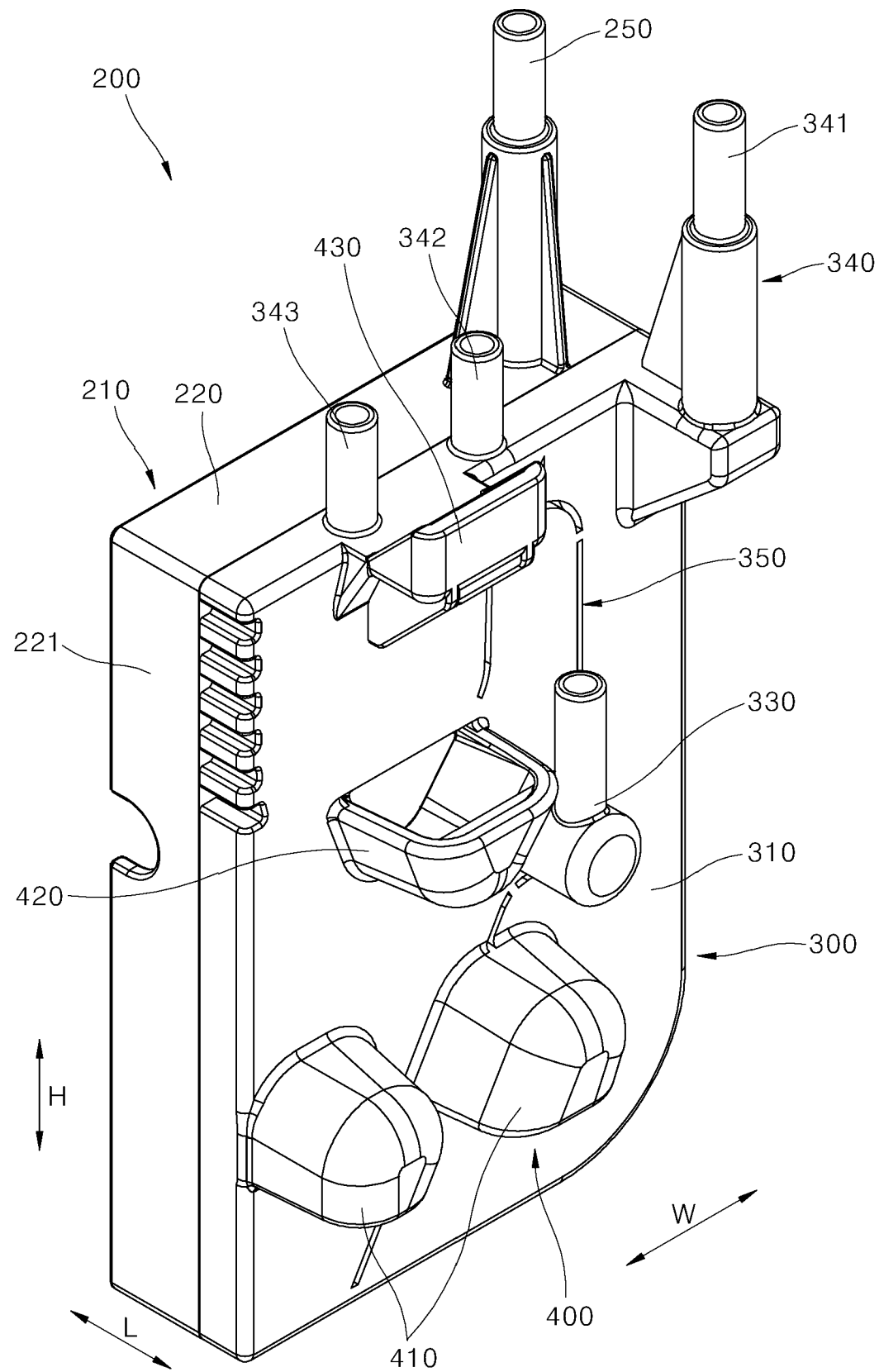
FIG. 22 is a perspective diagram illustrating an integrated waterway part according to one embodiment.

FIG. 18 is a perspective diagram illustrating a state where the valve 100 is connected to an integrated waterway part. FIG. 19 is a sectional diagram illustrating the valve 100 according to one embodiment. FIG. 20 is a sectional diagram illustrating a state where the valve 100 and the integrated waterway part 200 according to one embodiment are disassembled. FIG. 21 is a sectional diagram illustrating the valve 100 according to one embodiment that is a water inlet 110 of the valve 100 according to one embodiment is connected to the integrated waterway part 200. FIG. 22 is a perspective diagram illustrating an integrated waterway part 200 according to one embodiment.

As shown in FIGS. 18 to 22, the valve 100 may be inserted in the integrated waterway part 200 in one direction and a plurality of waterways connected to the valve 100 may be provided in the integrated waterway part 200. Various modifications may be applied to the integrated waterway part 200 within a scope of the above-mentioned technical feature. The integrated waterway part 200 may be integrally formed with injection mold connected with the valve 100 such that pipe way connection work of the valve 100 may be performed simply and exchange work of the pipe way may be performed smoothly. The integrated waterway part 200 may be divided into two members. Water ways for guiding water flow may be formed in the two members of the integrated waterway part 200, respectively. After that, the two members may be integrated to form the integrated waterway part 200.

Several water ways may be formed in the integrated water way part 200 and two or more injection molds may be connected to form the water ways. The water inlet 110 and the water outlet 120 that are provided in the valve 100 may be forwardly extended along the longitudinal direction L and inserted in the integrated water way part 200 to form water ways for water flow. The water inlet 110 and the water outlet 120 may be simply fitted in the integrated water way part 200. As needed, an auxiliary locking mechanism may be installed. For example, an auxiliary hook or a locking mechanism may be installed in the water ways of the water inlet 110 and the water outlet 120. Accordingly, the locking of the integrated water way part 200 and the valve 100 may be facilitated by the inserting of the water inlet 110 and the water outlet 120 in the integrated water way part 200. In case the locking is performed together with the connecting between the valve 100 and the integrated water way part 200, an auxiliary the case 500 for maintaining the connection between the valve 100 and the integrated water way part 200 may be omitted the valve 100.

The integrated water way part 200 according to one embodiment may include at least one of a first integrated water way part (or first liquid way assembly body) 210, a second integrated water way part (or second liquid way assembly body) 300, a handle 400, a sealing member (or seal) 440 or a sealing fix member 450.

[First Integrated Water Way Part]

Figure 23:
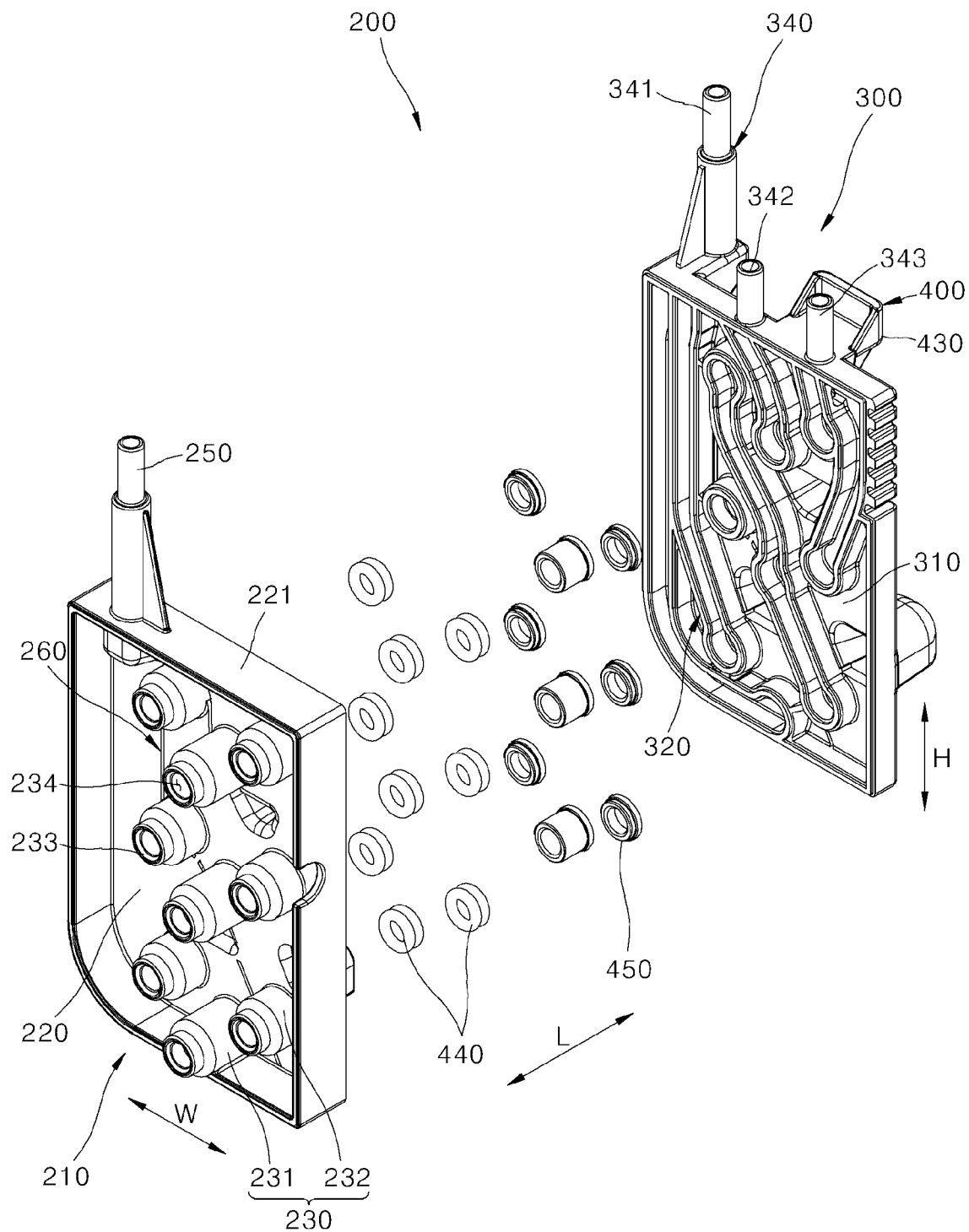
FIG. 23 is an exploded perspective diagram of an integrated waterway part according to one embodiment.
Figure 24:
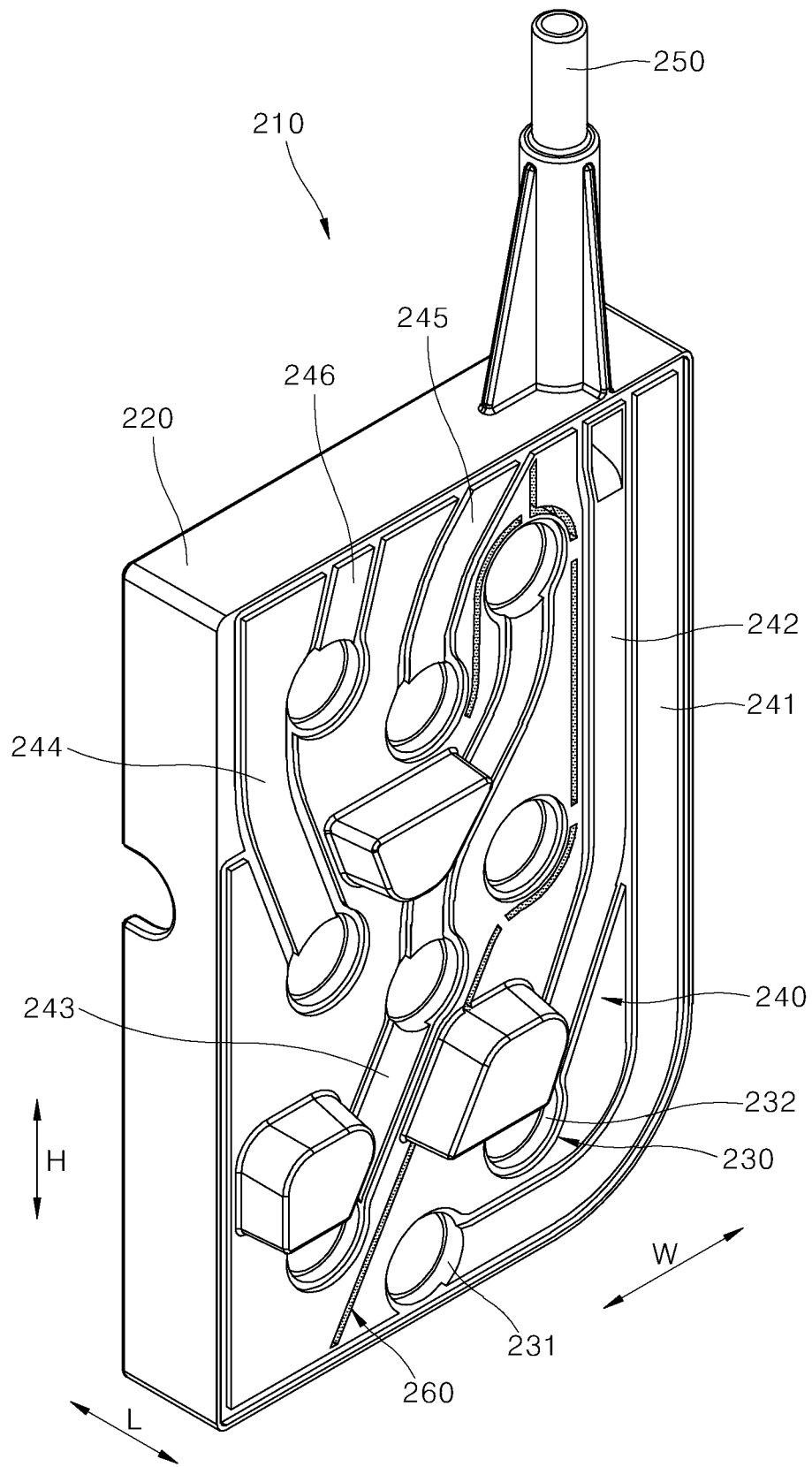
FIG. 24 is a perspective diagram illustrating an inside of a first integrated waterway part according to one embodiment.
Figure 25:
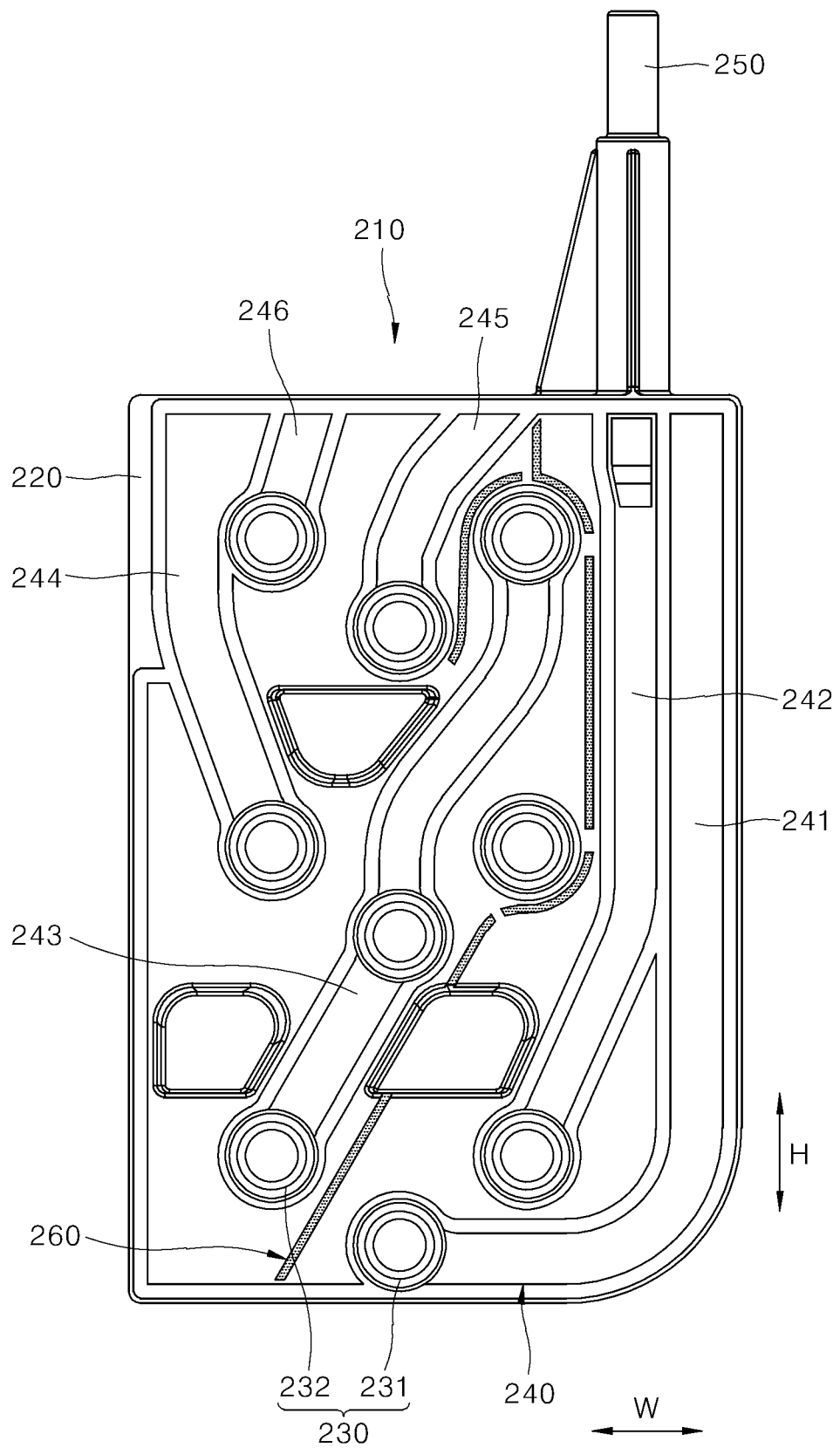
FIG. 25 is a front view illustrating an inside of a first integrated waterway part according to one embodiment.

FIG. 23 is an exploded perspective diagram of the integrated waterway part 200 according to one embodiment. FIG. 24 is a perspective diagram illustrating an inside of a first integrated waterway part 210 according to one embodiment. FIG. 25 is a front view illustrating an inside of the first integrated waterway part 210 according to one embodiment;

As shown in FIGS. 23 to 25, the first integrated water way part 200 may be connected with the valve 100 and a water way connected with the second integrated water way part 300 the first integrated water way part 210 may be formed in the first integrated water way part 200. Various modifications may be applicable to the first integrated water way part 200 within a scope of the above-mentioned technical feature. The first integrated water way part 210 according to one embodiment may include at least one of a first water way frame (or first liquid way frame) 220, a connecting protrusion 230, a first water way guide groove (or first liquid way guide groove) 240, a first connecting port 250 or a first heat shield groove 260.

The first water way frame 220 may be formed in a plate shape and provided in the case 500. The first water way frame 220 according to one embodiment may be a panel formed in an almost rectangular shape and a predetermined area of a corner may be curved.

In addition, a protruded piece 221 extended along a rim of the first water way frame 220 may be backwardly extended and formed in a shape covering a connection area between the valve 100 and the connecting protrusion 230. The protruded piece 221 may facilitate stable connection between the valve 100 and the connecting protrusion 230 and the structural rigidity of the first water way frame 220 may be enhanced. Also, a first connection 250 which will be described later may be connected to the protruded piece 221 such that the connection of the connecting pipe may be possible and that space utilization may be improved.

The connecting protrusion 230 may be protruded from the first waterway frame 220 toward the valve 100 and a hole may be provided in the connecting protrusion 230 to insert the valve 100 therein. Another hole 234 for a connect hole 327 may be provided in the connecting protrusion 230 to insert the valve 100. A guide surface 233 may be provided in one end of the connecting protrusion 230.

The guide surface may be provided in the connecting protrusion 230 facing the hole 234 for the connect hole 327. Such the guide surface 233 may have an inner diameter that becomes larger toward a rear area of the connecting protrusion 230. Accordingly, when the water inlet 110 and the water outlet 120 of the valve 100 are connected with the connecting protrusion 230, the guide surface 233 may guide the connecting move and the assembling and coupling efficiency may be then enhanced.

The connecting protrusion 230 may be projected to a rear area of the first waterway frame 220 and extended along a longitudinal direction L of the first integrated waterway part 210. The connecting protrusion 230 according to one embodiment of the present disclosure may include a first connecting protrusion 231 and a second connecting protrusion 232.

The first connecting protrusion 231 may be connected to the water inlet 110 provided in the valve 100 and water may flow from the integrated water way part 210 toward the water inlet 110. The first connecting protrusion 231 may be projected to a rear area of the first integrated water way part 210 and extended along the longitudinal direction L of the first integrated water way part 210. The hole 234 for the connect hole 327 may be provided in the first connecting protrusion 231. In this instance, the water inlet 110 of the valve 100 may be inserted in the first connecting protrusion 231 and connected to the water way provided in the integrated water way part 200.

The second connecting protrusion 232 may be connected to the water outlet 120 provided in the valve 100 and water may flow from the water outlet 120 to the inside of the integrated water way part 200. Even the second connecting protrusion 232 may be projected to the rear area of the first integrated water way part 210, together with the first connecting protrusion 231, and extended along the longitudinal direction L of the first integrated water way part 210. The hole 234 for the connect hole 327 may be provided in the second connecting protrusion 232. In this instance, the water outlet 120 of the valve 100 may be inserted in the second connecting protrusion 232 and connected to the water way provided in the integrated water way part 200.

The first integrated water way part 210 may include a water channel terminal 211 configured of one first connecting protrusion 231 and two second connecting protrusions 232. A plurality of water channel terminals 211 may be provided along a vertical direction of the first water way frame 220. According to one embodiment of the present disclosure, three water channel terminals 211 and the second connecting protrusions 232 may be disposed in both sides of the first connecting protrusion 231, respectively. The rearwardly protruded length of the first connecting protrusion 231 with respect to the first water way frame 220 may be longer than that of the second connecting protrusion 232. The water inlet 110 and the water outlet 120 may be projected to the front area of the valve 100. The projected length of the water outlet 120 connected to the valve 100 may be longer than that of the water inlet 110. Accordingly, the water inlet 110 may be connected to the first connecting protrusion 231 and the water outlet 120 may be stably connected to the second connecting protrusion, 232, and also water leak may be prevented.

The first water way guide groove 240 may be a groove for moving water to the inside of the first water way frame 220 facing the second integrated water way part 300. In addition, a plurality of first water way guide grooves 230 may be provided in the first water way frame 220. According to one embodiment, normal temperature water, heated water and chilled water may flow along the first water way guide groove independently. The coupling between the first and second integrated water way parts 210 and 300 may be performed in various methods including fusion. The first water way guide groove 240 may be connected to the hole 234 for the connect hole 327 of the connecting protrusion 230 such that the water moving toward the valve 100 and the water discharged from the valve 100 may flow along the first water way guide groove 240 independently.

The first water way guide groove 240 according to one embodiment may include at least one of a first inner groove 241, a second inner groove 242, a third inner groove 243, a fourth inner groove 244, a fifth inner groove 245 or a sixth inner groove 246.

The connecting protrusion 230 may be connected to a rear surface of the first water way frame 220. The first water way guide groove 240 for forming the water way connected with the valve 100 may be formed in a front surface of the first water way frame 220. The first water way guide groove 240 may be a concave groove formed in the front surface of the first water way frame 220.

The first inner groove 241 may be recessed from a width-direction W area of the first water way frame 220 vertically W and connected to the first connecting protrusion 231 disposed at the lowermost position in the first water way frame 220. The first inner groove 241 may be connected to the first water inlet 111 of the valve 100 and guide the water drawn into the integrated water way part 200 after purified to the first water inlet 111.

The second inner groove 242 may be connected to a first connection port 250 for discharging purified water toward a hot water module 902 and communicate with the inside of the second connecting protrusion 232 connected with the second valve 132. The second inner groove 242 may be arranged parallel to the first inner groove 241. Also, the second inner groove 242 may be extended to the lower area of the first water way frame 220 and then curved toward the second connecting protrusion 232 connected with the second valve 132. The normal temperature purified water discharged from the second valve 132 may be upwardly moved along the second inner groove 242 and then to the hot water module 902 via the first connection port 250 before heated.

The third inner groove 243 may form a pipe connected to the first valve 131, the second water inlet 112 and the sixth valve 136.

The fourth inner groove 244 may be connected to the third valve 133 for discharging purified water and a third protrusion port 343 for discharging the purified water outside the integrated water way part 200.

The fifth inner groove 245 may be connected to the third water inlet 113 for receiving the heated water for hot water or disinfection into the valve and a second protrusion port 342 for supplying the heated water to the integrated water way part 200. The third water inlet 113 may be in communication with the fifth inner groove 245 via the connecting protrusion 230 and an upper area of the fifth inner groove 245 may be in communication with the second protrusion port 342.

The sixth inner groove 246 may be connected to the sixth valve 136 for discharging hot water outside the integrated water way part 200. Also, the sixth inner groove 246 may be connected to a third protrusion port 343 for guiding the hot water discharge outside the integrated water way part 200.

The first connection port 250 may be connected to the first water way guide groove 240 and projected to the outside of the first water way frame 220 to be connected with the connecting pipe 800. The first connection portion 250 according to one embodiment may be a passage for supplying normal-temperature purified water to the hot water module 902. The first connection port 250 may be connected to the second inner groove 242.

The first heat shield groove 260 may be slit hole formed along a rim of the first water way groove 240 for supplying normal temperature water to the first water way frame 220. The first heat shield groove 260 may be formed between a water inlet way and a hot water way, which are formed in the integrated water way part, by slitting a case injection mold to prevent heat conduction. The first heat shield groove 260 may prevent the temperature of the purified water drawn into the integrated water way part 200 from be raised by the hot water flowing in the integrated water way part 200. The temperature rising of the purified water drawn into the integrated water way part 200, which is caused by the heat transferred by the hot water flowing in the integrated water way part 200, may be prevented or minimized such that the temperature of the hot water may be controlled more precisely.

The first heat shield groove 260 according to one embodiment may be provided between the second inner groove 242 in which normal temperature water flows and the third inner groove 243 in which heated water flows. The first heat shield groove 260 may include a slit hole formed between the second inner groove 242 and the third inner groove 243. The first heat shield groove 260 may be partially spaced apart by the first water way frame 220, not having a continuously formed hole. The first heat shield groove 260 may be arranged along a rim of the third inner groove 243 which is a passage of hot water.

Accordingly, the heat transferred by the hot water flowing along the third inner groove 243 may be shut off. The temperature rise of the normal water flowing along the first inner groove 241 or the second inner groove 242 by means of heat transfer may be prevented and water may be heated to a preset temperature when heating water for hot water. Accordingly, operation reliability of the water purifier 1 may be enhanced.

[Second Integrated Water Way Part]

Figure 26:
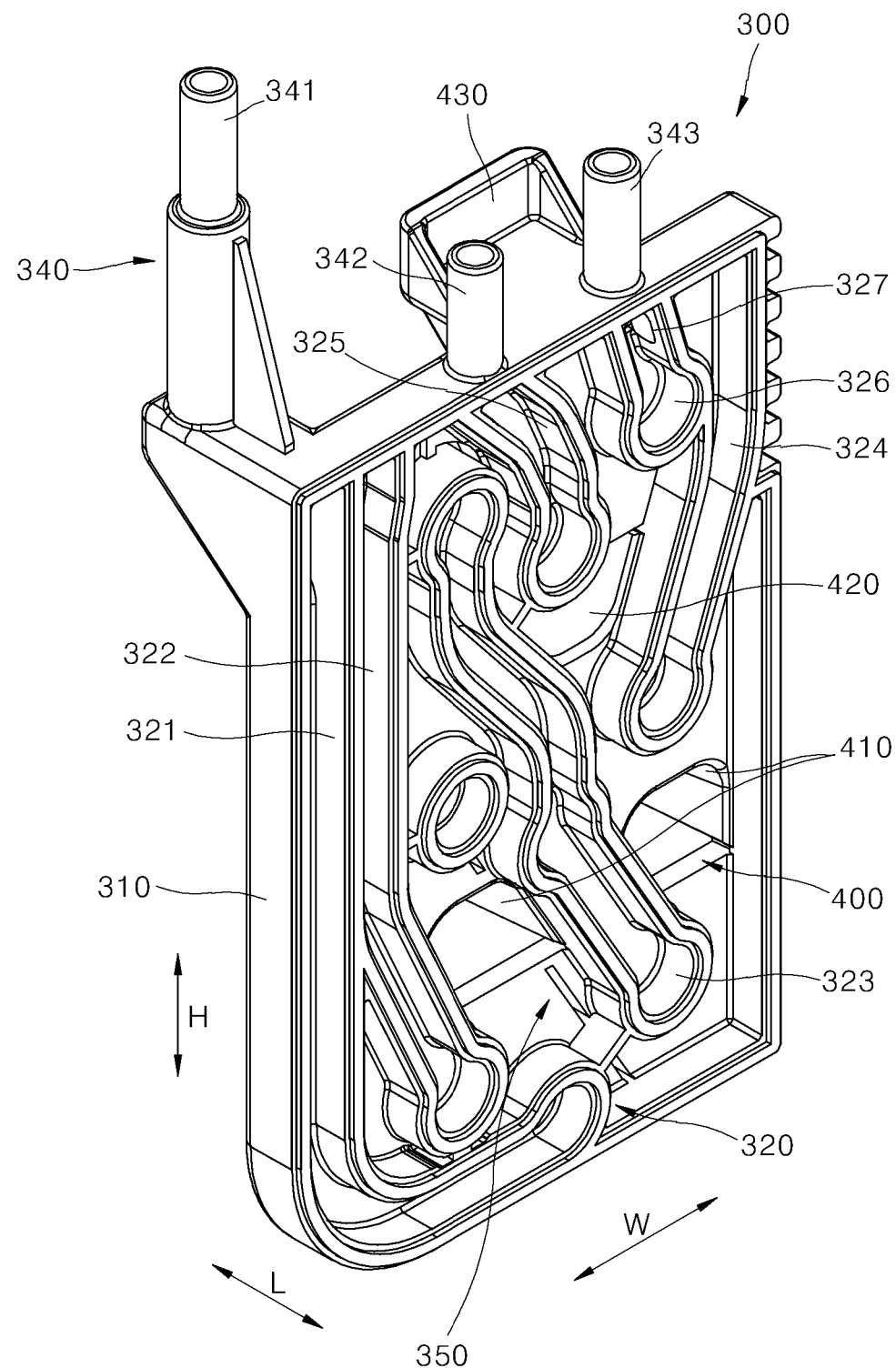
FIG. 26 is a perspective diagram illustrating an inside of a second integrated waterway part according to one embodiment.
Figure 27:
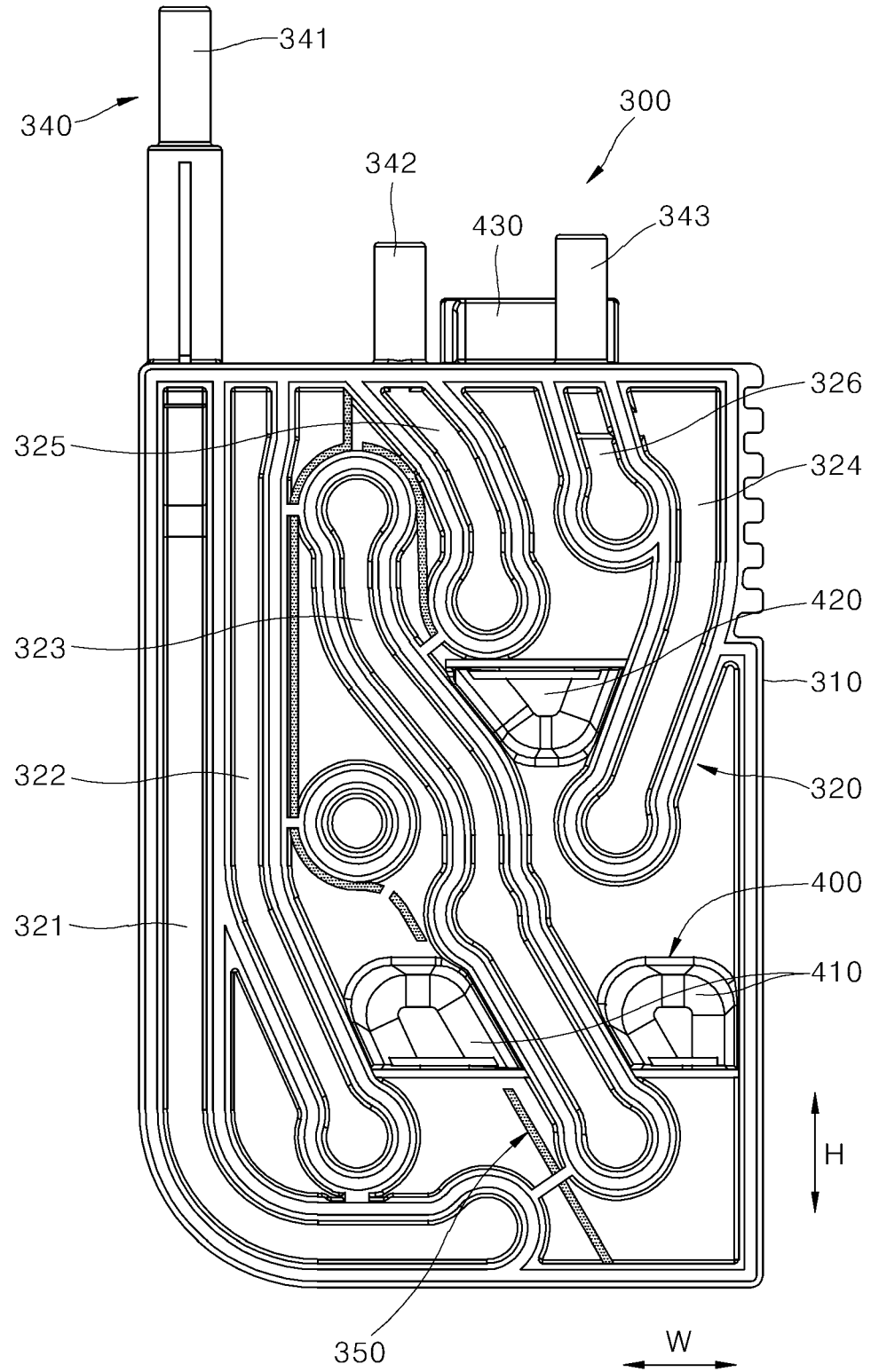
FIG. 27 is a front view illustrating an inside of a second integrated waterway part according to one embodiment.

FIG. 26 is a perspective diagram illustrating an inside of the second integrated waterway part 300 according to one embodiment. FIG. 27 is a front view illustrating an inside of the second integrated waterway part 300 according to one embodiment.

As shown in FIGS. 26 and 27, the second integrated water way part 300 may be coupled to the first integrated water way part 210. Various modifications may be applicable within a scope of a technical feature in that the water way for moving water is formed in the second integrated water way part 300. One water way connected with the valve 100 may be formed between the first integrated water way part 210 and the second integrated water way part 300. Accordingly, the water way of the integrated water way part 200 connected with the valve 100 may be connected with a connection portion 201 provided in the integrated water way part 200, such that the connections of the multiple connection pipe 800 may be performed to a one-touch type.

The second integrated water way part 300 according to one embodiment may include at least one of a second water way frame (or second liquid way frame) 310, a second water way guide groove (or second liquid way guide groove) 320, a second connection port 330, a third connection port 340 or a second heat shield groove 350.

The second water way frame 320 may be coupled to the first integrated water way part 210 and provided in the case 500 in a plate shape. The second water way frame 310 according to one embodiment may be corresponding to the second water way frame 220, and it may be formed in a plate shape and provided in the case 500. The second water way frame 320 according to one embodiment may be a panel formed in an almost rectangular shape and a predetermined area of a corner may be curved.

A rear surface of the second water way frame 310 may be secured to the first water way frame 220 and a front surface thereof may be connected to a handle 400.

The second water way guide groove 320 may be a groove for guiding water into the second water way frame 310 facing the first integrated water way part 210. In addition, a plurality of second water way guide grooves 320 may be provided in the second water way frame 320. According to one embodiment, normal temperature water, heated water and chilled water may flow along the first water way guide groove independently. The shape of the second water way guide groove 320 may be corresponding to that of the first water way guide groove 240. The first water way guide groove 240 and the second water way groove 320 may face each other, in communication, so as to guide the flow of the water inside the integrated water way part 200. The second water way guide groove 320 may form a concave groove in a rear surface of the second water way frame 310 facing the first water way guide groove 240.

The second water way guide groove 220 according to one embodiment may include at least one of a first outer groove 321, a second outer groove 322, a third outer groove 323, a fourth outer groove 324, a fifth outer groove 325 or a sixth outer groove 326 (or a connect hole 327).

The first outer groove 321 may be recessed from the other width direction W area of the second water way frame 310 vertically H and configured to form a concave shaped water way provided in a position facing the first inner groove 241. The water way formed by the first outer groove 321 and the first inner groove 241 may be connected to the first water inlet 111 of the valve 100 such that it may guide the water drawn into the integrated water way part 200 after being purified. In addition, the first outer groove 321 may be connected to the first protrusion port 341 and supplied purified water.

The water way formed by the second outer groove 322 and the second inner groove 242 may be connected to the first connection port 250 for discharging purified water toward the hot water module 902, and it may be in communication with the second connecting protrusion 232 connected to the second valve 132. The second outer groove 322 may be arranged parallel to the second outer groove 321 and inclinedly curved in a downward direction. The normal temperature purified water discharged from the second valve 132 may be upwardly moved along the formed by the second outer groove 322 and the second inner groove 242, and then moved to the hot water module 902 via the first connection portion 250 and heated.

The third outer groove 323 may be provided in a position facing the third inner groove 243. The water way formed by the third outer groove 323 and the second inner groove 243 may form a pipe way connected with the first valve 131, the second water inlet 112 and the sixth valve 136.

The fourth outer groove 324 may be provided in a position facing the fourth inner groove 244. The water way formed by the fourth outer groove 324 and the fourth inner groove 244 may form a pipe way connected with the third valve 133 for discharging purified water, the second water inlet 112 and the third protrusion port 343 for discharging purified water toward the outside the integrated water way part 200.

The fifth outer groove 325 may be provided in a position facing the fifth inner groove 245. The water way formed by the fifth outer groove 325 and the fifth inner groove 245 may be connected with the third water inlet 113 for leading heated water for hot water or disinfection into the valve 100 and the second protrusion port 342 for supplying heated water to the integrated water way 200. The third water inlet 113 may be in communication with the fifth inner groove 245 via the connecting protrusion 230 and an upper area of the fifth outer groove 325 may be in communication with the second protrusion port 342.

The sixth outer groove (the connect hole 327) may be provided in a position facing the sixth inner groove 246. The water way formed by the sixth outer groove (the connect hole 327) and the sixth inner groove 246 may be connected with the sixth valve 136 for discharging hot water to the outside of the integrated water way part 200. In addition, the sixth outer groove (the connect hole 327) may be connected to the third protrusion port 343 for guiding the hot water discharge outside the integrated water way part 200.

The second connection port 220 may be connected with the second water way guide groove 320. It may be projected to the outside of the water way frame 310 and connected with the connection pipe 800. The second connection port 330 according to one embodiment may be projected to a front area of the second water way frame 310 and connected with the connection pipe 800. In addition, the first connection port 250 may be in communication with the fourth valve 134 for guiding purified water to the cold water module 903.

The third connection port 340 may be connected with the second water way guide groove 320 and projected along an outer rim of the second water way frame 310, such that it may be connected with the connection pipe 800. The third connection port 340 according to one embodiment may include a first protrusion port 341, a second protrusion port 342 and a third protrusion port 343.

The first protrusion port 341 may be projected toward an upper area of the second integrated water way part 300 and communicable with the water way formed by the first inner groove 241 and the first outer groove 321. The first protrusion port 341 may be a passage for supplying purified water to the inside of the integrated water way part 200.

The second protrusion port 342 may be continuously formed with the first protrusion port 341 and projected to the upper area of the second integrated water way part 300. Also, the second protrusion port 342 may be in communication with the water way formed by the fifth inner groove 245 and the fifth outer groove 325. Such the second protrusion port 342 may be a passage for supplying heated water to the integrated water way part 200.

The third protrusion port 343 may be continuously formed with the second protrusion port 342 and projected to the upper area of the second integrated water way part 300. Also, the third protrusion port 343 may be in communication with the water way formed by the fourth inner groove 244 and the fourth outer groove 324 and the water way formed by the sixth inner groove 246 and the sixth outer groove 326. Such the third protrusion port 343 may be a passage for supplying heated water or purified water to the outside of the integrated water way part 200.

The third protrusion port 343 may be in communication with the water way formed by the fourth inner groove 244 and the fourth outer groove 324 and the water way formed by the sixth inner groove 246 and the sixth outer groove 326 by the connect hole 327. The two water ways may share the third protrusion port 343. According to one embodiment, an opening-shaped connect hole 327 may be provided in a partition wall for partitioning off the space into the fourth outer groove 324 and the sixth outer groove 326. Water ways of the fluid flowing in the fourth outer groove 324 and the sixth outer groove 326 may be connected with each other, while commonly using the third protrusion port 343. Accordingly, material cost and product cost may be saved and the number of the protrusion ports may be reduced enough to enhance design freedom and realize module compactness of the direct water way module 50.

The second heat shield groove may be a slit hole formed along a rim of the second water way guide groove 320 for supplying normal temperature water to the second water way frame 310. Case injection molding may be slit and a second heat shield groove 350 may be formed between the water inlet way and the hot water way formed in the integrated water way part 200. The second heat shield groove 350 may be provided in a position facing the first heat shield groove 260. The first heat shield groove 260 and the second heat shield groove 350 may prevent the temperature of the purified water drawn into the integrated water way part 200 from be raised by the hot water flowing in the integrated water way part 200. The temperature rising of the purified water drawn into the integrated water way part 200, which is caused by the heat transferred by the hot water flowing in the integrated water way part 200, may be prevented or minimized such that the temperature of the hot water may be controlled more precisely.

The second heat shield groove 350 according to one embodiment may be provided between the second outer groove 322 in which normal temperature water flows and the third outer groove 323 in which heated water flows. The second heat shield groove 350 may include a slit hole formed between the second outer groove 322 and the third outer groove 323. The second heat shield groove 350 may be partially spaced apart by the second water way frame 310, not having a continuously formed hole. The second heat shield groove 350 may be arranged along a rim of the third outer groove 323 which is a passage of hot water.

Accordingly, the heat transferred by the hot water flowing along the third outer groove 323 may be shut off. The temperature rise of the normal water flowing along the first inner groove 321 or the second outer groove 322 by means of heat transfer may be prevented and water may be heated to a preset temperature when heating water for hot water. Accordingly, operation reliability of the water purifier 1 may be enhanced.

A sealing member 440 and a sealing fix member 450 may be provided in the connecting protrusion 230 before the first integrated water way part 210 and the second integrated water way part 300 are coupled to each other. The may be provided in the connecting protrusion 230 in a state where the first integrated water way part 210 and the second integrated water way part 300 are coupled to each other.

The sealing member may be provided between the outer area of the vale 100 inserted in the connecting protrusion 230 and the inside of the connecting protrusion 230, to block water from flowing between the valve 100 and the connecting protrusion 230. The sealing member 440 may be formed in an O-ring shape. The sealing fix member 450 may be continuously formed with the sealing member and fixed to the connecting protrusion 230 to restrict the moving of the sealing member 440.

[Handle]

The handle 400 may be provided in a lateral surface of the integrated water way part 200. The user may move the integrated water way part 200, while holding the handle 400. The handle 400 may be provided in an opposite position to the valve 100 with respect to the integrated water way part 200. The handle 400 may be installed in an area that is exposed outside the case by the opening and closing of the case 500. Accordingly, the user may pull out the integrated water way part 200 out of the case 500 easily, while holding the handle 400.

Unless the handle 400 is provided, the user has to grab and pull a rim or edge of the integrated water way part 200. Because of that, the case 500 has to be enlarged as much as a space in which the user's finger(s) go(es). Accordingly, the external appearance of the direct water way module 50 is likely to become large and deteriorate design freedom, with the large size of the product.

To solve the problem, the handle 400 may be outwardly projected from the other lateral surface opposite to the lateral surface connected with the valve 100 and a working groove hooked by the user's hand may be provided in the handle 400. Various modifications may be applicable within a scope of the above-mentioned technical feature. The handle 400 according to one embodiment may include at least one of a first handle 410, a second handle 420 or a work handle 430.

The first handle 410 may be a working groove forwardly projected from the front area of the integrated water way part 200 and downwardly concave shaped. A plurality of first handles 410 may be provided and arranged along a width direction W of the integrated water way part 200.

The second handle 420 may be a working groove forwardly projected from the front area of the integrated water way part 200 and upwardly concave shaped. Plural first handles 410 may be provided. The number of the first handles 410 may be larger than that of the second handles 420. According to one embodiment, two first handles 410 and one second handle 420 may be provided. The user's thumb may go in the second handle 420 and the other fingers may go in the first handles 410. Accordingly, the user can grab the handle 400 with holding his or her fingers together and the grab of the handle 400 may be facilitated.

The work handle 430 may be provided over the second handle 420 and it may be a working groove projected from a front area or upper area of the integrated water way part 200 and upwardly concave shaped. Accordingly, the user may move the integrated water way part 200 farther from the valve 100, with grabbing the work handle 430 and the first handle 410.

[Replacement of Integrated Water Way Part]

When replacing the integrated water way part 200 in the water purifier 1 having the above configuration, the water purifier 1 may not be disassembled completely but only the integrated water way part 200 may be disassembled and replaced. Accordingly, the time and money required by the replacement and maintenance of the integrated water way part 200 may be saved.

When one of the water purifier 1 is detached, the door 700 may be exposed to the side of the water purifier 1. Hence, a bolt is unfastened from the case body 600 to decouple the door 700 and the securing hook 714 may be unlocked to decouple the door 700 from the case body 600.

Hence, the user may pull the integrated water way part 200 forwardly, while grabbing the handle 400 provided in the front area of the integrated water way part 200, and then, the integrated water way part may be disassembled from the valve 100. The integrated water way part 200 decoupled from the valve 100 may be moved through the front opening 602 of the case body 600.

Water that falls during the disassembling of the integrated water way part 200 may be collected in the water drip tray 662 provided in the case base 660 such that the water falling to the outside of the water purifier 1 may be prevented. Accordingly, an area around the working spot will not become messy or wet by water. Meanwhile, a worker may remove the water falling in the water drip tray 662 while working the replacement of the integrated water way part 200.

The integrated water way part 200 may be decoupled from the valve 100 by one-touch method such that work efficiency may be improved. After replacing the old integrated water way part 200 used for a preset time period with a new one, the worker may move the integrated water way part 200 toward the valve 100 through the front opening 602 of the case body 600.

The water inlet 110 and the water outlet 120 may be inserted in the connecting protrusion 230 of the integrated water way part 200. Then, the integrated water way part 200 may be connected to the valve 100. After the cover securing protrusion 713 of the door 700 is inserted in the fix securing hole 633 of the case body 600, the securing hook 714 of the door 700 may be hooked on the door connecting portion 630 and preliminary coupling of the door 700 may be performed. Hence, a bolt may be inserted in the move securing hole 715 provided in the door 700 and fastened to the fix securing hole 633 provided in the case body 600 such that the coupling process of the door 700 may be complete.

The anti-separation rib 720 provided in the door 700 may support the integrated water way part 200. Accordingly, the integrated water way part 200 pressed toward the door 700 by means of the water pressure may contact with the anti-separation rib 720 and the moving may be restricted.

Water leak between the valve 100 and the integrated water way part 200 may be prevented.

The integrated water way part 200 may be sliding-moved to be decoupled from or coupled to the valve 100. The case 500 may be installed to surround the integrated water way part 200 and the valve, in a state where the integrated water way part 200 is coupled to the valve 100, such that the separation of the integrated water way part 200 from the valve 100 may be prevented. In addition, as the integrated water way part 200 may be sliding-moved to be decoupled from or coupled to the valve 100, the decoupling or coupling process of the integrated water way part 200 may be performed smoothly and the working time required by the process may be saved.

The plurality of the pipe ways connected with the valve 100 may be integrally formed in the integrated water way part 200. Accordingly, the work connecting the pipe ways to the valve 100 may be performed simply and the work time for the replacement of the pipe ways may be saved, because only the integrated water way part 200 is replaced.

In addition, the plurality of the pipe lines connected with the valve 100 may be integrated into the integrated water way part 200 and structural simplification may be realized such that an effect of saving material cost may be provided.

[Connecting Connection Pipe]

The plurality of the connection ports 201 connected with the connection pipe 800 may be provided in the integrated water way part 200.

The first connection port 250 projected from the upper area of the first integrated water way part 210 may be in communication with the water way formed by the second inner groove 242 and the second outer groove 322. Also, the first connection port 250 may be connected with the hot water module 902 via the connection pipe 800 such that the water discharged via the first connection port 250 may be heated by the hot water module 902.

The third connection port 340 projected from the upper area of the second integrated water way part 300 may include a first protrusion port 341, a second protrusion port 342 and a third protrusion port 343. The first protrusion port 341 may be in communication with the water way formed by the first inner groove 241 and the first outer groove 321 such that the water purified while passing through the filter 901 may flow into the first protrusion port 341 via the connection pipe 800.

The second protrusion port 342 may be continuously formed with the first protrusion port 341 and communicate with the water way formed by the fifth inner groove 245 and the fifth outer groove 325 such that the water heated by the hot water module 902 may be supplied to the water way formed by the fifth inner groove 245 and the fifth outer groove 325 via the second protrusion port 342.

The third protrusion port 343 may be continuously formed with the second protrusion port 342 and communicate with the water way formed by the sixth inner groove 246 and the sixth outer groove 326 and the water way formed by the fourth inner groove 244 and the fourth outer groove 324.

The water for being discharged via the water way formed by the fourth inner groove 244 and the fourth groove 324 as purified water may be moved to the water discharge valve 905 via the third protrusion port 343, and then discharged outside the water purifier through a water discharge hole 906.

Alternatively, the water for being discharged as hot water via the water way formed by the sixth inner groove 246 may be moved to the water discharge valve 905 via the third protrusion port 343, and then discharged outside the water purifier through the water discharge hole 906.

The second connection port 330 projected from the front area of the second integrated water way part 300 may be curved to avoid the interference with the door 700. The second connection port 330 may be connected with the fourth valve 134 for discharging cold water. Accordingly, the purified water supplied to the integrated water way part 200 via the fourth valve 134 may be moved to the cold water module 903 through the second connection port 330 and the connection pipe 800, and then chilled to a preset temperature to be cold water. Hence, after passing through the water discharge valve 905 and the water discharge hole 906, the cold water may be discharged outside the water purifier 1.

Although the connection port 201 is provided in the upper and front areas of the integrated water way part 200, the embodiments are not limited thereto. It is obvious that it may be provided in other various areas such as a lower area or a lateral area of the integrated water way part 200.

[Distinguishable Configuration of Case]

In the water purifier 1 according to the present disclosure, the moving of the integrated water way part sliding-movable to be detachable from the valve 100 may be restricted by the case 500, such that the separation between the valve 100 and the integrated water way part 200 may be prevented or water leak may be prevented to enhance the operation reliability of the water purifier 1. The disassembling of the door 700 provided to restrict the moving of the integrated water way part 200 may be performed smoothly. Accordingly, the time and money required by the disassembling and assembling of the integrated water way part 200.

The case 500 may include the case body 600 and the door 700. The valve 100 may be detachably coupled to the case body 600. When the integrated water way part 200 is decoupled from the valve 100, the case 500 may restrict the moving of the valve 100 to make the decoupling of the integrated water way part 200 quick and smooth.

The door 700 may be detachably coupled to the case body 600. As it is coupled to the case body 600, the door 700 may contact with the integrated water way part 200 and restrict the moving of the integrated water way part 200 toward the door 700 by means of the water pressure.

In addition, the case 500, the valve 100 and the integrated water way part 200 may compose the direct water way module 50. The direct water way module 50 may be assembled and replaced by unit to improve productivity and save replacement and maintenance cost.

[Distinguishable Configuration of Handle]

According to the present disclosure, the user may pull out the integrated water way part 200 out of the case 500 smoothly, with grabbing the handle 400. Accordingly, the time and money required by the replacement and maintenance of the integrated water way module may be saved.

For that, the handle 400 provided in the front area of the integrated water way part 200 may be exposed outside, after the door 700 is decoupled from the case body 600. In this instance, the handle 400 may include the first handle 410 and the second handle 420. The user may put the fingers in the first handle 410 and the second handle 420 and move the integrated water way part 200 outside the case body 600 smoothly.

Upper-lower surfaces and left-right surfaces of the integrated water way part 200 may be in contact with the case body 600 or there is not enough room between them for the fingers to go in. Unless the handle 400 is provided, the integrated water way part 200 may not be pulled out from the case body 600.

Accordingly, the present disclosure suggests the handle 400 installed in the front area of the integrated water way part 200. To facilitate the user's manipulation of the handle 400 including grabbing and pulling, two first handles 410 may be provided in a lower area and one second handle 420 in which the thumb is put may be provided over the first handle 410.

In addition, an auxiliary work handle 430 may be provided over the first handle 410 and the user's pulling of the integrated water way part 200 may be facilitated much more smoothly.

[Operation of Water Purifier]

FIG. 28 is a block diagram illustrating key parts of the water purifier 1 according to one embodiment.

As shown in FIG. 28, the raw water supplied via the water supply hole 900 may pass through the filter 901 to eliminate foreign substances and be purified water. The purified water may be drawn into the first water inlet 111 via the integrated water way part 200 and discharged via the first water outlet 121 or the second water outlet 122. Once the first valve 131 is put into operation, purified water may be discharged via the first water outlet. Once the second valve 132 is put into operation, purified water may be discharged via the second water outlet 122.

The purified water discharged via the first water outlet 121 may be heated in the hot water module 902 and then supplied to the third water inlet 113. Hence, the water may be discharged via the fifth water outlet 125 or the sixth water outlet 126. Once the fifth valve 135 is put into operation, hot water may be discharged via the fifth water outlet 125. Once the sixth valve 136 is put into operation, hot water may be discharged via the sixth water outlet 126. The hot water discharged via the fifth water outlet 125 may be moved to the water discharge hole 906 by the water discharge valve 905 and discharged outside the water purifier 1.

The hot water discharged via the sixth water outlet 126 may be used for a disinfection function. The hot water moved to the third water inlet 112 and discharged via the third water outlet 123 or the fourth water outlet 124.

Once the third valve 133 is put into operation, hot water for disinfection may be discharged via the third water outlet 123. Once the fourth valve 134 is put into operation, hot water for disinfection may be discharged via the fourth water outlet 124. The hot water discharged via the third water outlet 123 may pass the cold water module 903 to disinfect and the water may be discharged outside the water purifier 1 by a drain valve 904. The hot water discharged via the fourth water outlet 124 may directly move to the drain valve 904 and then discharged outside the water purifier 1.

The purified water discharged via the second water outlet 122 may be moved to the second water inlet 112, and then discharged via the third water outlet 123 or the fourth water outlet 124. Once the third valve 133 is put into operation, purified water to be chilled may be discharged and chilled while passing through the cold water module 903. Hence, the chilled water may sequentially pass through the water discharge valve 905 and the water discharge hole 906 and discharged outside the water purifier 1.

Once the fourth valve 134 is put into operation, purified water may be discharged via the fourth water outlet 124 and moved to the water discharge hole 905. Hence, the purified water may sequentially pass through the water discharge valve 905 and the water outlet hole 906 and discharged outside the water purifier 1.

[Purified Water Discharge]

The purified water discharged from the filter 901 may be supplied to the integrated water way part 200 by the first protrusion port 341. After moved to the first water inlet 111 along the water way formed by the first outer groove 321 and the first inner groove 241, the purified water may be discharged via the first water outlet 121 based on the operation of the first valve 131.

The water may be moved to the second water inlet 112 along the water way formed by the third outer groove 323 and the third inner groove 243 and, then discharged via the third water outlet 123 based on the operation of the third valve 133. After that, the water may be moved to the upper area of the integrated water way part 200 along the water way formed by the fourth outer groove 324 and the fourth inner groove 244. Hence, the water may be moved into the water way formed by the sixth outer groove 326 and the sixth inner groove 246 via the connect hole 327. After that, the water may be moved to the water discharge valve 905 by the third protrusion port 343 and then discharged outside the water purifier 906 via the water discharge hole 906.

[Cold Water Discharge]

The purified water discharged from the filter 901 may be supplied to the integrated water way part 200 by the first protrusion port 341. After moved to the first water inlet 111 along the path formed by the first outer groove 321 and the first inner groove 241, the water may be discharged to the first water outlet 121 based on the operation of the first valve 131.

Hence, the water may be moved to the second water inlet 112 along the water way formed by the third outer groove 323 and the third inner groove 243, and then discharged to the fourth water outlet 123 based on the operation of the fourth valve 134. The purified water may be moved to the cold water module 903 by the second connection portion 330 projected from the front area of the second integrated water way part 300. After that, the cold water may be chilled and moved to the water discharge hole 905 to be discharged out of the water purifier 1.

[Hot Water Discharge]

The purified water discharged from the filter 901 may be supplied to the integrated water way part 200 by the first protrusion port 341. The purified water may be moved to the first water inlet 111 along the water way formed by the first outer groove 321 and the first inner groove 241, and then discharged via the second water outlet 122 based on the operation of the second valve 132.

After moved to the first connection port 250 along the water way formed by the second outer groove 322 and the inner groove 242, the purified water may be moved and heated in the hot water module 902 along the connection pipe 800. Hence, the heated water may be moved along the water way formed by the fifth groove 325 and the fifth inner groove 245 by the second protrusion port 342, and then supplied to the third water inlet 113.

The hot water discharged via the fifth water outlet 125 based on the operation of the fifth valve may be moved to the water discharge hole 905 by the third connection port 340. After that, the hot water may be discharged out of the water purifier 1 via the water discharge hole 906.

[Purified Water Way Disinfection]

The purified water discharged from the filter 901 may be supplied to the integrated water way part 200 via the first protrusion port 341. After moved to the first water inlet 111 along the water way formed by the first outer groove 321 and the first inner groove 241, the purified water may be discharged via the second water outlet 122 based on the operation of the second valve 132.

After moved to the first connection port 250 along the water way formed by the second outer groove 322 and the second inner groove 242, the purified water may be moved and heated in the hot water module 902 along the connection pipe 800. The heated water may be moved along the water way formed by the fifth outer groove 325 and the fifth inner groove 245 by the second connection port 330 and drawn into the third water inlet 113.

The hot water draw into the third water inlet 113 may be discharged via the sixth water outlet 126 based on the operation of the sixth valve 136 and downwardly moved to the second water inlet along the water way formed by the third outer groove 323 and the third inner groove 243.

Hence, the hot water may be discharged via the third water outlet 123 based on the operation of the third valve 133. After discharged via the third water outlet 123 based on the operation of the third valve 133, the hot water may be upwardly moved to the integrated water way part 200 along the water way formed by the fourth outer groove 324 and the fourth inner groove 244. The water may be moved into the water way formed by the sixth outer groove 326 and the sixth inner groove 246 via the connect hole 327. After that, the hot water may be moved to the drain valve 904 by the third protrusion port 243 and drained out of the water purifier 1.

The hot water heated in the hot water module 902 may disinfect the inside of the water way, while moved along the purified water way. Accordingly, water purification quality may be improved.

[Cold Water Way Disinfection]

The purified water discharged from the filter 901 may be supplied to the integrated water way part 200 via the first protrusion port 341. After moved to the first water inlet 111 along the water way formed by the first outer groove 321 and the first inner groove 241, the purified water may be discharged via the second water outlet 122 based on the operation of the second valve 132.

After moved to the first connection port 250 along the water way formed by the second outer groove 322 and the second inner groove 242, the purified water may be moved and heated in the hot water module 902 along the connection pipe 800. The heated water may be moved along the water way formed by the fifth outer groove 325 and the fifth inner groove 245 by the second connection port 330 and drawn into the third water inlet 113.

The hot water draw into the third water inlet 113 may be discharged via the sixth water outlet 126 based on the operation of the sixth valve 136 and downwardly moved to the second water inlet along the water way formed by the third outer groove 323 and the third inner groove 243.

The hot water may be discharged via the fourth water outlet 124 based on the operation of the fourth valve 134. The hot water moved to the cold water module 903 by the second connection port 330 projected from the front area of the second integrated water way part 300 may disinfect the inside of the cold water module 903 and be moved to the drain valve 904. After that, the hot water may be drained outside the water purifier 1.

At this time the operation of the cold water module 903 may be stopped to prevent the hot water for disinfection from being chilled. The hot water heated in the hot water module 902 may disinfect the inside of the water way, while moved along the cold water way. Accordingly, purification quality may be improved.

[Hot Water Way Disinfection]

The purified water discharged from the filter 901 may be supplied to the integrated water way part 200 via the first protrusion port 341. After moved to the first water inlet 111 along the water way formed by the first outer groove 321 and the first inner groove 241, the purified water may be discharged via the second water outlet 122 based on the operation of the second valve 132.

After moved to the first connection port 250 along the water way formed by the second outer groove 322 and the second inner groove 242, the purified water may be moved and heated in the hot water module 902 along the connection pipe 800. The heated water may be moved along the water way formed by the fifth outer groove 325 and the fifth inner groove 245 by the second connection port 330 and drawn into the third water inlet 113.

The hot water moved to the third water inlet 113 may be discharged via the fifth water outlet 125 based on the operation of the fifth valve 135. Then, the water may be moved to the drain valve 904 by the third connection port 340 and drained outside the water purifier 1.

The hot water heated in the hot water module 902 may disinfect the inside of the water way, while moved along the hot water way. Accordingly, water purification quality may be improved.

Accordingly, an object of the present disclosure is to address the above-noted and other problems. Embodiments of the present disclosure provide a water purifier that may prevent the components connected to an integrated waterway module from separating from the waterway module or prevent the water leak at a connection area between them by a water pressure, when the integrated waterway module having a plurality of waterways is connected with other components.

Another object of the present disclosure is to provide a water purifier that may save the time and money require for replacement and maintenance work of the integrated waterway module by disassembling only the waterway module from the water purifier to replace, not disassemble all the water purifier.

A further object of the present disclosure is to provide a water purifier including an integrated waterway module that is provided with an auxiliary door configuration for disassembling only the integrated waterway module from the water purifier in which the integrated waterway module is installed.

Aspects according to the present disclosure are not limited to the above ones, and other aspects and advantages that are not mentioned above can be clearly understood from the following description and can be more clearly understood from the embodiments set forth herein. Additionally, the aspects and advantages in the present disclosure can be realized via means and combinations thereof that are described in the appended claims.

Embodiments of the present disclosure may provide a water purifier that may include a valve; an integrated water way part; and a case covering the integrated water way part, in a state where the integrated water way part is moved in one direction and coupled to the valve.

Specifically, in a state where the valve and the integrated water way part are coupled to each other, the case may cover the valve and the integrated water way part. Accordingly, the moving of the integrated water way part in a direction getting farther from the valve may be restricted and water leak between them may be prevented.

One side of the case may be open and closed such that the pulling out and replacement of the integrated water way part may be performed smoothly.

Specifically, the case may have one side that is open and closed to expose the integrated water way outside. Accordingly, the integrated water way part may be pulled out and replaced even without disassembling the water purifier completely.

The water purifier may include a handle provided in a lateral surface of the integrated water way part.

Specifically, the handle may be installed in the other lateral surface opposite to one lateral surface of the integrated water way part facing the valve. The handle may be installed in the exposed area by the opening of the case. Accordingly, a user may smoothly pull out the integrated water way part out of the case, with grabbing the handle.

The water purifier may include the valve, the integrated water way part and the case that may be integrally formed with each other to compose one module.

The valve may include a plurality of valves configured to control water flow. The valve may include a water inlet for drawing water and a plurality of water outlets for discharging water. An operation valve may be provided in each of the water outlets to adjust a water discharge direction of the water drawn via the water inlet.

The water inlet, the water outlets and the actuation valves may compose a valve module. The valve module may be installed and replaced by module unit. A plurality of valve modules may be provided and disposed in the case to be connected with the integrated water way part.

The integrated water way part may include a plurality of water ways connected with the valve. The valve may be inserted in the water ways. The integrated water way part may include at least one of a first integrated water way part, a second integrated water way part, a handle, a sealing member or a sealing fix member.

The first integrated water way part may be connected with the valve. The first integrated water way part may include at least one of a first water way frame, a connection protrusion, a first water way guide groove, a first connection protrusion or a first heat shield groove.

The first water way frame may be formed in a plate shape and provided in the case.

The connection protrusion may be protruded from the first water way frame toward the valve and include a hole in which the valve is inserted.

The connection protrusion may include a first connection protrusion and a second connection protrusion. The first connection protrusion may be connected with a water inlet provided in the valve and configured to move water toward the water inlet from the integrated water way part. The second connection protrusion may be connected with a water outlet provided in the valve and configured to move water from the water outlet into the integrated water way part.

The first integrated water way part may include a water way terminal configured of one first connection protrusion and two second connection protrusions. A plurality of water way terminals may be installed along a vertical direction of the first water way frame.

The first water way guide groove may have a groove formed in the first water way frame facing the second integrated water way part and configured to guide water flow. A plurality of first water way guide grooves may be provided in the first water way frame. Normal temperature water, heated water and chilled water may flow along the first water way guide groove independently.

The first connection port may be connected with the first water way guide groove and projected from an outer area of the first water way frame to be connected with the connection pipe.

The first heat shield groove may be a slit hole formed along a rim of the first water way guide groove supplying the normal temperature water to the first water way frame.

The second integrated water way part may include a connection port coupled to the first integrated water way part and connected with a connection pipe. A water way may be formed between the first integrated water way part and the second integrated water way p art. The second integrated water way part may include at least one of a second water way frame, a second water way guide groove, a second connection port, a third connection port or a second heat shield groove.

The second water way frame may be coupled to the first integrated water way part and provided in the case in a plate shape.

The second water way guide groove may have a groove formed in the second water way frame facing the first integrated water way part and configured to guide water flow. A plurality of second water way guide grooves may be provided in the second water way frame, and normal temperature water, heated water and chilled water flow along the second water way guide groove independently.

The second connection port may be connected with the second water way guide groove and the protruded from a front area of the second water way frame to be connected with the connection pipe.

The third connection port may be connected with the second water way guide groove and the protruded from an outer rim of the second water way frame to be connected with the connection pipe.

The second heat shield groove may have a slit hole formed along a rim of the second water way guide groove supplying normal temperature water to the second water way frame.

The sealing member may be provided between the valve inserted in the connection protrusion and the connection protrusion and configured to block water moving between the valve and the connection protrusion.

The sealing fix member may be continuously formed with the sealing member and fixed to the connection protrusion to restrict the moving of the sealing member.

The handle may be protruded from a front area of the integrated water way part and have a work groove formed in a downwardly concave shape. The handle may include at least one of a first handle, a second handle or a work handle.

The first handle may be and have a work groove formed protruded from a front area of the integrated water way part and formed in a downwardly concave shape. The second handle may be protruded from a front area of the integrated water way part and have a work groove formed in an upwardly concave shape. A plurality of first handles may be provided. The number of the first handles may be larger than that of the second handles.

The work handle may be provided over the second handle. The work handle may be protruded from a front area or an upper area of the integrated water way part and have a work groove formed in an upwardly concave shape.

The case may cover the valve and the integrated water way part, in a state where the valve and the integrated water way are coupled to each other. The case may have one side that is open and closed to expose the integrated water way outside. The case may press the integrated water way part toward the valve. After one side of the case facing the integrated water way part is open, the integrated water way may be decoupled from the valve. The case may include a case body and a door.

The case body may cover the valve and the integrated water way part and have one side that is open to form a front opening. The case body may cover a rear surface and lateral surfaces of the valve. The valve may be disposed in the case body. The case body may include a door disposing portion and a door connecting portion.

The valve may be disposed in the valve disposing portion and cover lateral surfaces and a rear surface of the valve. The valve disposing portion may include valve restricting frame and a frame connecting portion.

The valve restricting frame may be provided in both width-direction lateral areas of the valve and configured to restrict the moving of the valve. the valve restricting frame may include a valve securing protrusion extended from the water way disposing portion and configured to restrict the moving of the valve by having the valve hooked on a protrusion projected there from toward the inside of the case body.

The valve securing protrusion may include an extended support piece rearwardly extended from the water way disposing portion toward the frame connecting portion in a plate shape; and a valve securing hook protruded toward an inner surface of the extended support piece and configured to be hooked on an outer surface of the valve, and when one end of the extended support piece is moved farther from the valve, the valve securing hook is spaced apart from the valve and the restricting of the valve is released.

The valve securing protrusion may include a valve support pane extended along a longitudinal direction of the valve, spaced apart a preset distance from the valve securing protrusion, and configured to connect the water way disposing part and the frame connecting portion with each other.

The frame connecting portion may be extended along a width direction of the valve and configured to connect an end of the valve restricting frame.

The water way disposing portion may be extended from the valve disposing portion, the water way disposing portion in which the integrated water way part is disposed. The water way disposing portion may include an extended frame and an inner protrusion.

The extended frame may be provided in both width-direction lateral areas of the integrated water way part and configured to connect the valve disposing portion and the door connecting portion with each other, the extended frame having a projection formed in a border area with an inner surface of the valve disposing portion to hook the integrated water way part thereon.

The inner protrusion may be protruded from an inner surface of the extended frame and supporting the integrated water way part.

The case body may include a case cover and a case base.

The case cover may be configured to cover an upper area above the valve and the integrated water way part and connected with at least one of the valve disposing portion, the water way disposing portion or the door connecting portion.

A first cover plate may be formed in a plate shape and configured to cover the upper area above the valve and the integrated water way part;

A guide groove may have a concave groove recessed from an inner surface of the first cover plate, the guide groove in which a connection pipe connected with the integrated water way part is disposed.

A rigidity reinforcing protrusion may be extended along a rim of the first cover plate and the guide groove and protruded toward an upper or lower area of the first cover plate.

The case base may cover a lower area under the valve and the integrated water way part and be connected with at least one of the valve disposing portion, the water way disposing portion or the door connecting portion. The case base may include a second cover plate and a water drip tray.

The second cover plate may be configured to cover a lower area under the valve and the integrated water way part. The water drip tray formed in a concave shape recessed from the second cover plate facing a connecting portion between the valve and the integrated water way part and configured to collect falling water.

The door connecting portion may be extended from a front area of the water way disposing portion and connected with the door.

The case body may include a reinforcing rib protruded from at least one of the valve disposing portion, the water way disposing portion or the door connecting portion. The reinforcing rib may be extended along a longitudinal direction of the case body.

The door may be coupled to the door body to open and close the front opening and provided in a position facing the integrated water way, the door configured to support the integrated water way, in a state of closing the front opening. The door may include a door body and an anti-separation rib.

The door body may be detachably coupled to the case body. The door body may include a door plate. The door may also include a water leak check portion having a hole passing through the door plate and configured to check water leak from the integrated water way part. The door body may also include a cover securing protrusion protruded from a width-direction area of the door plate and inserted in the case body. The door body may further include a securing hook protruded from the other width direction area of the door plate and formed in a hook shape to be secured to the case body.

The anti-separation rib may be extended from the door body toward the integrated water way part, and configured to support the integrated water way part at an opposite position to the valve and restrict the moving of the integrated water way part.

The integrated water way part may be sliding-moved and decoupled from the valve and the moving of the integrated water way part may restricted by the case such that the separation between the valve and the integrated water way part or water leak between them may be prevented. Accordingly, the water purifier according to the present disclosure may have an effect of improving operation reliability.

Furthermore, the water purifier does not have to be disassembled to replace the integrated water way part. Only the integrated water way part may be disassembled from the water purifier and replaced. Accordingly, the time and money required by the replacement and maintenance of the integrated water way part may be saved.

Still further, the user may pull out the integrated water way part out of the case smoothly and easily, with grabbing the handle. Accordingly, the time and money required by the replacement and maintenance of the integrated water way part may be saved.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments are described herein with reference to cross-section illustrations that are schematic illustrations of idealized embodiments (and intermediate structures). As such, variations from the shapes of the illustrations as a result, for example, of manufacturing techniques and/or tolerances, are to be expected. Thus, embodiments should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A liquid dispenser comprising:
    a valve assembly including a plurality of valves configured to control a direction of liquid flow;
    a liquid way assembly in which the valve assembly is inserted along one predetermined direction and including a plurality of liquid ways that are connected with the valves; and
    a case that covers the valve assembly and the liquid way assembly when the valve assembly and the liquid way assembly are coupled to each other, the case being open to expose the liquid way assembly,
    wherein the case includes:
        a case body covering the valve assembly and the liquid way assembly and having one side that is open to form a front opening; and
        a door coupled to the case body to open and close the front opening and provided in a position facing the liquid way assembly, the door being configured to support the liquid way assembly when closing the front opening, and
    wherein the door includes:
        a door body detachably coupled to the case body; and
        an anti-separation rib that is extended from the door body toward the liquid way assembly, and configured to support the liquid way assembly at an opposite position of the valve assembly and restrict a moving of the liquid way assembly.

2. The liquid dispenser of claim 1,
    wherein the case body includes:
        a valve assembly disposing portion that receives the valve assembly, the valve assembly disposing portion being shaped to surround a rear area and lateral areas of the valve assembly;
        a liquid way assembly disposing portion that is extended from the valve assembly disposing portion and receives the liquid way assembly; and
        a door connecting portion extended from a front area of the liquid way assembly disposing portion and coupled to the door.

3. The liquid dispenser of claim 2,
    wherein the valve assembly disposing portion includes:
        a valve restricting frame provided in both width-direction lateral areas of the valve assembly and configured to restrict a moving of the valve assembly; and
        a frame connecting wall extended along a width direction of the valve assembly and configured to connect an end of the valve restricting frame.

4. The liquid dispenser of claim 3,
    wherein the valve restricting frame includes:
        a valve securing protrusion extended from the liquid way disposing portion and configured to restrict a moving of the valve assembly by having the valve assembly hooked on a protrusion projected therefrom toward an inside of the case body; and
        a valve support pane extended along a longitudinal direction of the valve assembly, spaced apart a preset distance from the valve securing protrusion, and configured to connect the liquid way assembly disposing portion and the frame connecting wall with each other.

5. The liquid dispenser of claim 4,
    wherein the valve securing protrusion includes:
        an extended support plate rearwardly extended from the liquid way assembly disposing portion toward the frame connecting wall; and
        a valve securing hook protruded toward an inner surface of the extended support plate and configured to be hooked on an outer surface of the valve assembly, and
    wherein, when one end of the extended support plate is moved farther from the valve assembly, the valve securing hook is spaced apart from the valve assembly and restricting of the valve assembly is released.

6. The liquid dispenser of claim 2,
    wherein the case body further includes:
        a reinforcing rib outwardly protruded from at least one of the valve disposing portion, the liquid way assembly disposing portion or the door connecting portion, and extended along a longitudinal direction of the case body.

7. The liquid dispenser of claim 2,
    wherein the liquid way assembly disposing portion includes:
        an extended frame provided in both width-direction lateral areas of the liquid way assembly and configured to connect the valve assembly disposing portion and the door connecting portion with each other, the extended frame having a projection formed in a border area with an inner surface of the valve assembly disposing portion to hook the liquid way assembly thereon; and
        an inner protrusion protruded from an inner surface of the extended frame and supporting the liquid way assembly.

8. The liquid dispenser of claim 2,
    wherein the case body includes:
        a case cover configured to cover an upper area above the valve assembly and the liquid way assembly and connected with at least one of the valve disposing portion, the liquid way assembly disposing portion or the door connecting portion; and
        a case base configured to cover a lower area under the valve assembly and the liquid way assembly, and connected at least one of the valve disposing portion, the liquid way assembly, or the door connecting portion.

9. The liquid dispenser of claim 8,
    wherein the case cover includes:
        a first cover plate formed in a plate shape and configured to cover the upper area above the valve assembly and the liquid way assembly;
        a guide groove having a concave groove recessed from an inner surface of the first cover plate, the guide groove receiving a connection pipe connected with the liquid way assembly; and
a rigidity reinforcing protrusion extended along a rim of the first cover plate and the guide groove and protruded toward an upper or lower area of the first cover plate.

10. The liquid dispenser of claim 8,
wherein the case base includes:
a second cover plate configured to cover a lower area under the valve assembly and the liquid way assembly; and
a drip tray formed in a concave shape recessed from the second cover plate facing a connection between the valve assembly and the liquid way assembly, and configured to collect falling liquid.

11. The liquid dispenser of claim 1,
wherein the door body includes:
a door plate;
a hole passing through the door plate and configured to release liquid leaking from the liquid way assembly;
cover securing protrusion protruded from a width-direction area of the door plate and inserted in the case body; and
a securing hook protruded from the other width direction area of the door plate and formed in a hook shape to be secured to the case body.

12. The liquid dispenser of claim 1,
wherein the liquid way assembly includes:
a first liquid way assembly body configured to be connected with the valve assembly; and
a second liquid way assembly body connected with the first liquid way assembly body and including a connection port connected with a connection pipe, and
wherein a liquid way is formed between the first liquid way assembly body and the second liquid way assembly body and is connected to the valve assembly.

13. The liquid dispenser of claim 12,
wherein the first liquid way assembly body includes:
a first liquid way frame formed in a plate shape and provided in the case; and
a connection protrusion protruded from the first liquid way frame toward the valve assembly and having a hole in which the valve assembly is inserted.

14. The liquid dispenser of claim 13,
wherein the first liquid way assembly body includes:
a first liquid way guide groove having a groove formed in the first liquid way frame, facing the second integrated liquid way assembly body, and configured to guide liquid flow; and
a first connection port connected with the first liquid way guide groove and projected from an outer area of the first liquid way frame to be connected with the connection pipe.

15. The liquid dispenser of claim 14,
wherein the connection protrusion includes:
a first connection protrusion connected with a liquid inlet provided in the valve assembly and configured to facilitate liquid flow from the liquid way assembly toward the liquid inlet; and
a second connection protrusion connected with a liquid outlet provided in the valve assembly and configured to facilitate liquid flow from the liquid outlet into the liquid way assembly.

16. The liquid dispenser of claim 12,
wherein the second liquid way assembly body includes:
a second liquid way frame coupled to the first liquid way assembly body and provided in the case; and
a second liquid way guide groove having a groove formed in the second liquid way frame facing the first liquid way assembly body and configured to guide liquid flow.

17. The liquid dispenser of claim 16,
wherein a plurality of the second liquid way guide grooves are provided in the second liquid way frame, and ambient temperature liquid, heated liquid, and chilled liquid flow independently along the plurality of second liquid way guide grooves.

18. The liquid dispenser of claim 1,
wherein the liquid way assembly includes a handle protruded from a first lateral surface opposite to a second lateral surface connected with the valve assembly and having a work groove in which a user's finger is received.

19. A liquid dispenser comprising:
a valve assembly including a plurality of valves configured to control a direction of liquid flow;
a liquid way assembly in which the valve assembly is inserted along one predetermined direction and including a plurality of liquid ways that are connected with the valves; and
a case that covers the valve assembly and the liquid way assembly when the valve assembly and the liquid way assembly are coupled to each other, the case being open to expose the liquid way assembly,
wherein the case includes:
a case body covering the valve assembly and the liquid way assembly and having one side that is open to form a front opening; and
a door coupled to the case body to open and close the front opening and provided in a position facing the liquid way assembly, the door being configured to support the liquid way assembly when closing the front opening, and
wherein the case body includes:
a valve assembly disposing portion that receives the valve assembly, the valve assembly disposing portion being shaped to surround a rear area and lateral areas of the valve assembly;
a liquid way assembly disposing portion that is extended from the valve assembly disposing portion and receives the liquid way assembly; and
a door connecting portion extended from a front area of the liquid way assembly disposing portion and coupled to the door;
wherein the case body further includes:
a reinforcing rib outwardly protruded from at least one of the valve disposing portion, the liquid way assembly disposing portion or the door connecting portion, and extended along a longitudinal direction of the case body.

20. A liquid dispenser comprising:
a valve assembly including a plurality of valves configured to control a direction of liquid flow;
a liquid way assembly in which the valve assembly is inserted along one predetermined direction and including a plurality of liquid ways that are connected with the valves; and
a case that covers the valve assembly and the liquid way assembly when the valve assembly and the liquid way assembly are coupled to each other, the case being open to expose the liquid way assembly, wherein the liquid way assembly includes:
- a first liquid way assembly body configured to be connected with the valve assembly,
- a second liquid way assembly body connected with the first liquid way assembly body and including a connection port connected with a connection pipe, wherein a liquid way is formed between the first liquid way assembly body and the second liquid way assembly body and is connected to the valve assembly, and wherein the first liquid way assembly body includes:
- a first liquid way frame formed in a plate shape and provided in the case; and
- a connection protrusion protruded from the first liquid way frame toward the valve assembly and having a hole in which the valve assembly is inserted.

* * * * *